ALARM SIGNALING SYSTEM

Original Filed Sept. 13, 1950 21 Sheets-Sheet 1

INVENTORS C. E. CLUTTS
G. A. PULLIS
A. K. SCHENCK
L. A. WEBER

BY. C. Mattice

ATTORNEY

ALARM SIGNALING SYSTEM

Original Filed Sept. 13, 1950 21 Sheets-Sheet 2

INVENTORS C. E. CLUTTS
G. A. PULLIS
A. K. SCHENCK
L. A. WEBER
BY C. Mathie
ATTORNEY

ALARM SIGNALING SYSTEM

Original Filed Sept. 13, 1950 21 Sheets-Sheet 3

INVENTORS C. E. CLUTTS
G. A. PULLIS
A. K. SCHENCK
L. A. WEBER

BY C. Mattice

ATTORNEY

INVENTORS C. E. CLUTTS
G. A. PULLIS
A. K. SCHENCK
L. A. WEBER

BY C. Mattice

ATTORNEY

INVENTORS C. E. CLUTTS
G. A. PULLIS
A. K. SCHENCK
L. A. WEBER
BY C. Mattice
ATTORNEY

ALARM SIGNALING SYSTEM

Original Filed Sept. 13, 1950 21 Sheets-Sheet 6

INVENTORS C. E. CLUTTS
G. A. PULLIS
A. K. SCHENCK
L. A. WEBER

BY C. Mattice
ATTORNEY

ALARM SIGNALING SYSTEM

Original Filed Sept. 13, 1950 21 Sheets-Sheet 7

INVENTORS C. E. CLUTTS
G. A. PULLIS
A. K. SCHENCK
L. A. WEBER
BY C. Mattice
ATTORNEY Nov. 11, 1952 C. E. CLUTTS ET AL Re. 23,571

ALARM SIGNALING SYSTEM

Original Filed Sept. 13, 1950 21 Sheets-Sheet 8

INVENTORS C. E. CLUTTS
G. A. PULLIS
A. K. SCHENCK
L. A. WEBER

BY C. Mattice

ATTORNEY

ALARM SIGNALING SYSTEM

Original Filed Sept. 13, 1950 21 Sheets-Sheet 9

INVENTORS C. E. CLUTTS
G. A. PULLIS
A. K. SCHENCK
L. A. WEBER
BY C. Mattice
ATTORNEY INVENTORS C. E. CLUTTS
G. A. PULLIS
A. K. SCHENCK
L. A. WEBER
BY C. Mattice
ATTORNEY

ALARM SIGNALING SYSTEM

Original Filed Sept. 13, 1950 21 Sheets-Sheet 11

INVENTORS C. E. CLUTTS
G. A. PULLIS
A. K. SCHENCK
L. A. WEBER
BY C. Mattise
ATTORNEY

ALARM SIGNALING SYSTEM

Original Filed Sept. 13, 1950 21 Sheets-Sheet 12

INVENTORS C.E. CLUTTS G.A. PULLIS A.K. SCHENCK L.A. WEBER
BY C. Mattice
ATTORNEY INVENTORS C. E. CLUTTS
G. A. PULLIS
A. K. SCHENCK
L. A. WEBER
BY C. Mattice
ATTORNEY

ALARM SIGNALING SYSTEM

Original Filed Sept. 13, 1950 21 Sheets-Sheet 14

INVENTORS C. E. CLUTTS
G. A. PULLIS
A. K. SCHENCK
L. A. WEBER
BY C. Mattice
ATTORNEY

ALARM SIGNALING SYSTEM

Original Filed Sept. 13, 1950 21 Sheets-Sheet 15

INVENTORS C.E. CLUTTS
G.A. PULLIS
A.K. SCHENCK
L.A. WEBER
BY C. Mattice
ATTORNEY

ALARM SIGNALING SYSTEM

Original Filed Sept. 13, 1950 21 Sheets-Sheet 16

INVENTORS C. E. CLUTTS
G. A. PULLIS
A. K. SCHENCK
L. A. WEBER
BY C. Mattice
ATTORNEY

ALARM SIGNALING SYSTEM

Original Filed Sept. 13, 1950 21 Sheets-Sheet 17

INVENTORS C. E. CLUTTS
G. A. PULLIS
A. K. SCHENCK
L. A. WEBER
BY C. Mattice
ATTORNEY

INVENTORS C. E. CLUTTS
G. A. PULLIS
A. K. SCHENCK
L. A. WEBER

BY C. Mattice
ATTORNEY

ALARM SIGNALING SYSTEM

Original Filed Sept. 13, 1950 21 Sheets-Sheet 19

INVENTORS C. E. CLUTTS
G. A. PULLIS
A. K. SCHENCK
L. A. WEBER
BY C. Mattice
ATTORNEY

INVENTORS C. E. CLUTTS
G. A. PULLIS
A. K. SCHENCK
L. A. WEBER

BY C. Mattice

ATTORNEY

INVENTORS C. E. CLUTTS
G. A. PULLIS
A. K. SCHENCK
L. A. WEBER
BY C. Mathie
ATTORNEY Reissued Nov. 11, 1952

Re. 23,571

UNITED STATES PATENT OFFICE 23,571

ALARM SIGNALING SYSTEM

Charles E. Clutts, Mountain Lakes, N. J., George A. Pullis, Riverdale, N. Y., and Alfred K. Schenck, Glen Ridge, and Laurance A. Weber, Livingston, N. J., assignors to Bell Telephone Laboratories, Incorporated, New York, N. Y., a corporation of New York Original No. 2,583,088, dated January 22, 1952, Serial No. 184,632, September 13, 1950. Application for reissue September 11, 1952, Serial No. 309,159

8 Claims. (Cl. 177—353)

This invention relates to alarm signaling systems and has for its object to facilitate the indication of alarm or other conditions at remote signaling stations.

Where a series of subsidiary signaling stations are normally unattended, means must be provided to transmit indications to an attended main station.

In accordance with applicants' invention an indication transmitting arrangement is provided using alternating current which is suitable for use over ether wire or radio communication channels.

The stations included in the signaling system are connected by two channels, one for carrying signals to the main station and the other for carrying signals from the main station and for two-way conversation. The signaling and talking equipment at all of the stations is bridged on the two channels.

Each unattended station is equipped with a plurality of alarms and condition indicating devices, each having a definite location in relation to a scanning arrangement, and the main station has a set of lamps corresponding to the alarms and condition indicating devices which appear in corresponding locations in relaton to an indication scanning or distributing arrangement.

Means is provided at the main station for transmitting a plurality of code signals over one channel, each code signal representing a particular order for a particular remote station. Certain of these code signals initiate the operation of the alarm scanning arrangements, there being a different code signal for this purpose for each remote station.

When one such signal is sent out from the main station over one channel, the remote station signaled initiates the operation of its scanning arrangement and sends out signals over the other channel to initiate and control the operation of the indication scanning arrangement at the main station. When an operated alarm or condition indicating device is scanned a different signal is transmitted over the other channel to cause the corresponding lamp at the main station to be lighted.

If more than a given number of subsidiary stations are to be served by a particular main station, the subsidiary stations are divided into two groups, each group connected to a separate one-way channel, both groups being connected to the two-way channel.

These and other features of the invention will be more clearly understood from a consideration of the following description in connection with the drawings in which:

Figs. 1 to 13 show the equipment at the main station; Figs. 1 and 4 showing the sequence signal generator; Figs. 2, 3 and 5 showing the sequence signaling keys and signal transmitter; Figs. 6, 7, 9 and 10 showing the indication scanning arrangement; Fig. 8 showing the alarm registering circuit; Figs. 11 to 13 showing the filters and detectors for receiving signals;

Figs. 14 and 15 show in schematic form the two channels and the bridging circuits;

Figs. 16 to 20 show the equipment at the unattended station; Fig. 16 showing the alarm signal transmitting circuit; Fig. 17 showing the order receiving circuit; Fig. 18 showing typical alarm crcuits; Figs. 19 and 20 showing the alarm and indication scanning arrangement;

Fig. 23 shows the manner in which Figs. 1 to 20 should be arranged.

Figure 1:
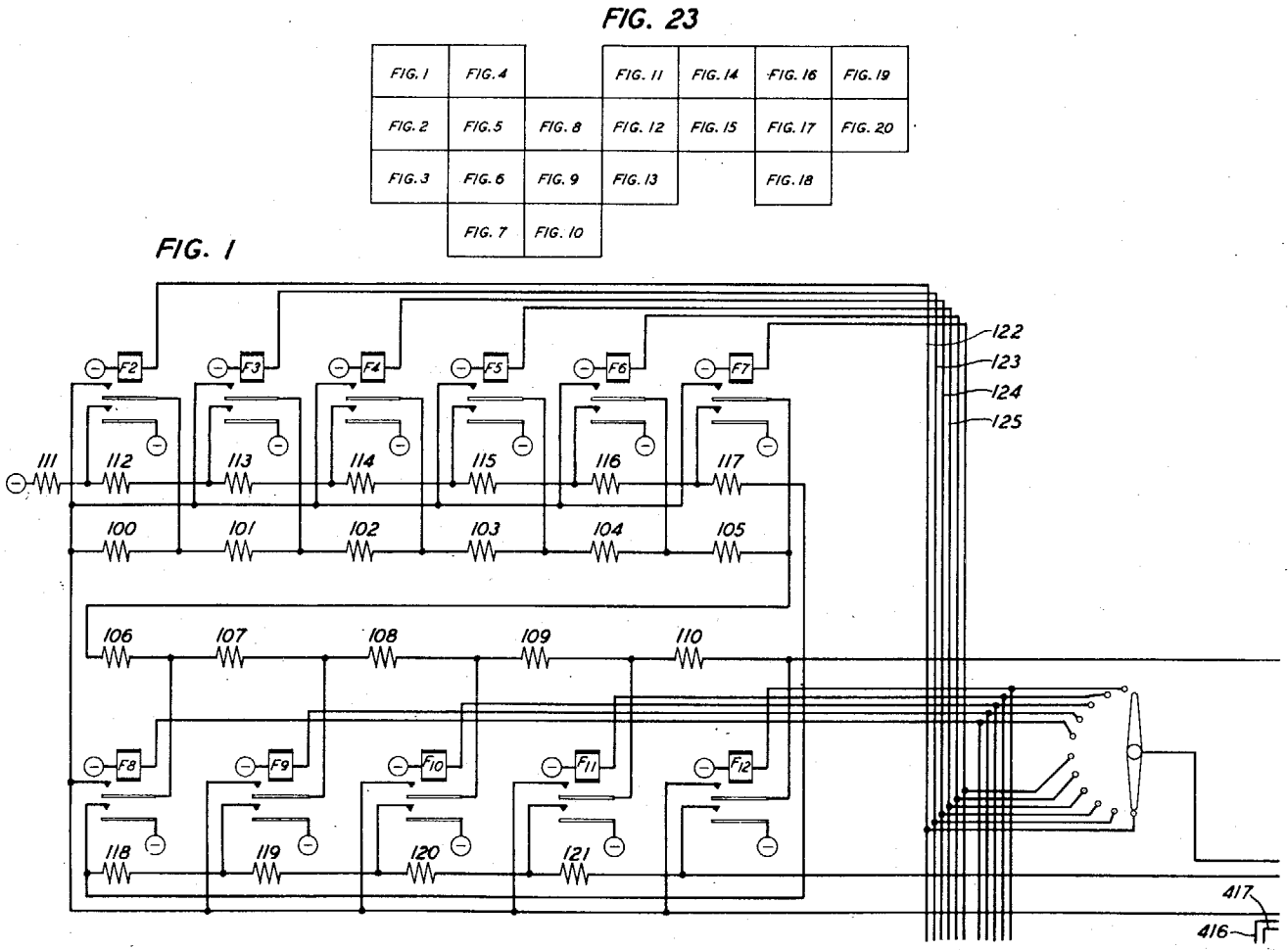
Figure 2:
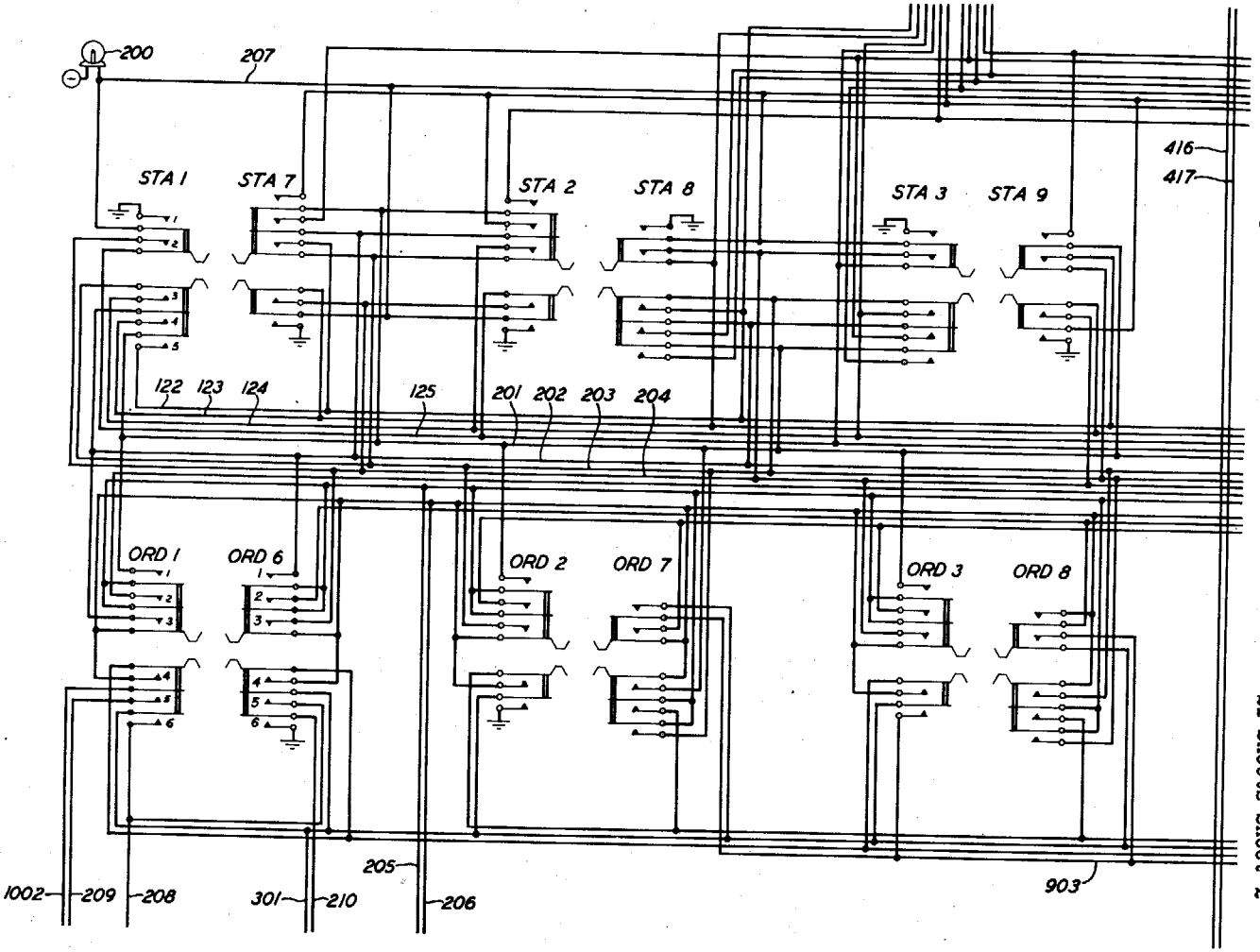

In the drawings the relays and certain other equipment have been given functional letter designations and in the specification these designations will be followed by the number of the figure in which each relay appears, enclosed in parentheses, to facilitate locating the relays on the drawing.

Figure 21:
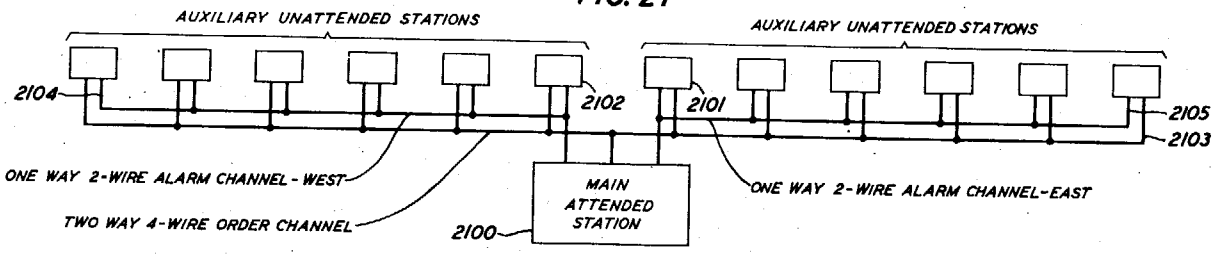
Fig. 21 shows the arrangement of the stations in the system.

As shown in Fig. 21, the alarm signaling system includes a main or attended station 2100 and a plurality of subsidiary or unattended stations 2101, 2102, etc., connected by two channels which may extend over wires or radio waves. The system as shown is arranged to serve a maximum of twelve remote stations all of which are bridged to one channel 2103 which is a four-wire two-way channel to which the main station is also bridged. One-half of the remote stations are bridged to one two-wire one-way channel 2104 and the other half are bridged to a similar channel 2105, the two channels conveniently extending in two directions from the main station, which is bridged to both one-way channels.

Figure 22:
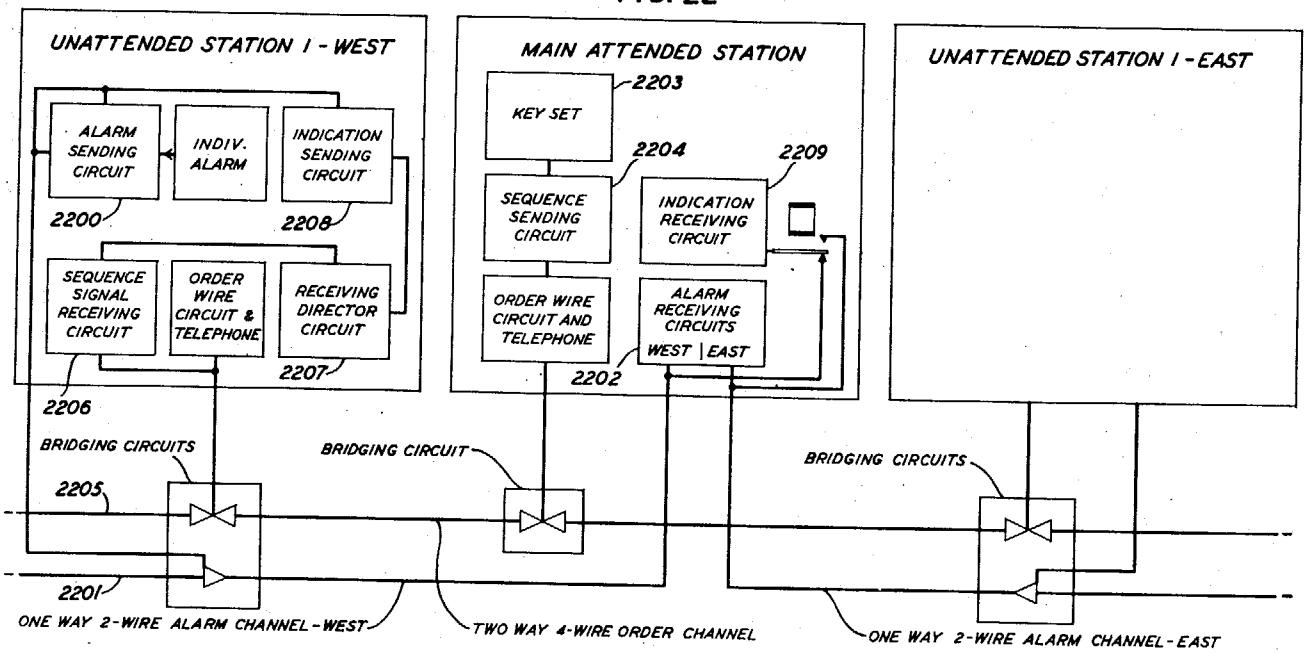
Fig. 22 shows in diagrammatic form the arrangement of the equipment at the stations.

Referring to Fig. 22, each remote station is provided with an alarm sending circuit 2200 which normally connects a characteristic frequency to the two-wire channel 2201 which is received by an alarm receiving circuit 2202 at the main station which includes an individual receiving unit for each remote station. Six frequencies are used, one for each station connected to one two-wire channel, and twelve receiving units are provided, six connected to each of the two-wire channels. When an alarm condition arises at a remote station, the characteristic frequency is interrupted for a measured length of time and the corresponding receiving circuit at the main station functions to give an alarm and identify the station from which the alarm signal was received.

The attendant then operates a key corresponding to the station in trouble and the indication order key in keyset 2203 which causes the sequence sending circuit 2204 to transmit a code signal over the four-wire circuit 2205 which will be effectively received only by the sequence signal receiving circuit 2206 at the station in trouble. The receiving director circuit 2207 at this station then starts a pulse generator which transmits pulses to operate the indication sending circuit or alarm scanner 2208 at that station and transmits pulses of 900-cycle current over the two-wire channel 2201, which are received at the main station and operate the indication receiving circuit or scanner 2209 at the main station in synchronism with the alarm scanner 2208 at the remote station. When the alarm scanner 2208 reaches the position corresponding to the operated alarm, a pulse of 700-cycle current is sent out over the two-wire circuit 2201 which is received by the main station and by means of the indication scanner 2209 causes the operation of a relay corresponding to the operated alarm, which relay lights a lamp to identify the alarm condition. Certain positions on the alarm scanner may be connected to condition indicating devices instead of to alarms and may be used for transmitting information concerning such conditions, for example, the operated or non-operated condition of pieces of equipment.

DETAILED DESCRIPTION

Alarm sending

The circuits shown in Figs. 16 to 20 are those located at one of the subsidiary stations, which has been assumed to be station 1 on the west two-wire channel.

Figure 18:
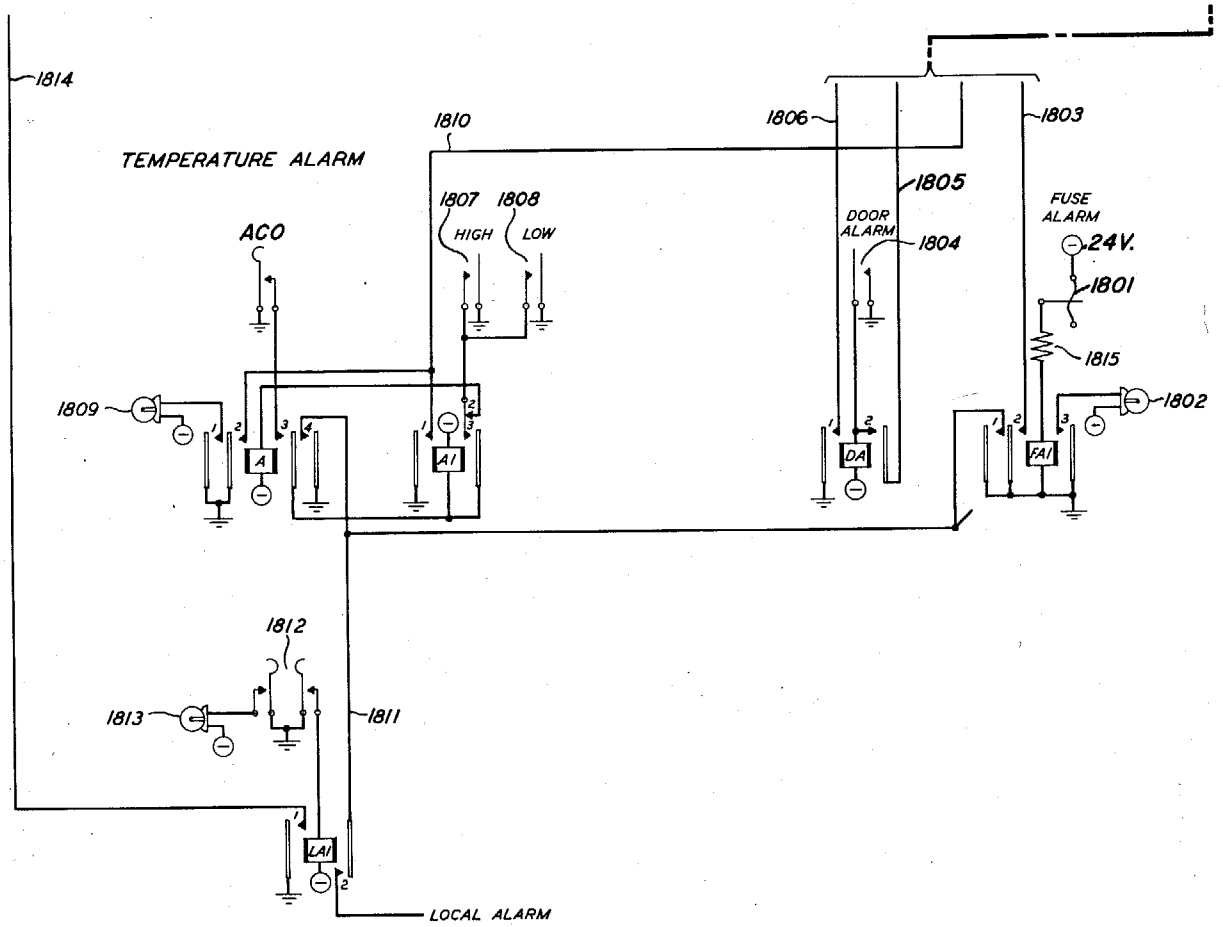

Referring first to Fig. 18, there are shown in this figure a few typical alarms. For example, each battery supply is connected to the circuits which it supplies through individual fuses such as fuse 1801. If a fuse is blown, battery from the source, shown as 24 volts, is connected through resistance 1815 to ground through the winding of a fuse alarm relay FA1(18). Relay FA1(18) lights the corresponding lamp 1802 and connects ground to conductors 1803 and 1811. A similar arrangement would be provided for the battery supplies for other voltages such as for +130 volts, +250 volts, etc. When the door of the unattended office is opened, a door contact 1804 is closed operating relay DA(18). Relay DA(18) operates and locks over conductor 1805 to ground at contact 7 of the associated alarm relay AN(16) so that it cannot be released by the closure of the door. Relay DA(18) grounds conductor 1806. On the assumption that extremes of temperature affect the performance of the equipment located at the unattended office two thermostats 1807 and 1808 are provided, thermostat 1807 closing its contact for high temperatures and thermostat 1808 closing its contact for low temperatures. If either thermostat contact closes, ground is connected over that contact, contact 2 of relay A1(18) to battery through the winding of relay A(18). Relay A(18) lights lamp 1809 and connects ground to conductors 1810 and 1811. The connection of ground to conductor 1811 is normally ineffective, but whenever an attendant is working at the office he will close key 1812 to operate the local alarm relay LA1(18) which extends conductor 1811 to a local alarm circuit so that he may be informed of alarm conditions arising while he is on duty. The operation of key 1812 also lights lamp 1813 as an indication that the key is operated. If the relay A(18) is operated he may cut off the local alarm by operating alarm cut-off key ACO(18) which connects ground over contact 3 of relay A(18) to battery through the winding of relay A1(18). Relay A1(18) operates and locks to the closed thermostat contact, releases relay A(18) to silence the alarm and connects a substitute ground to conductor 1810 to maintain the alarm indication.

It will be understood that the alarm circuits shown are intended only to be typical and that many other specific alarm circuits would be provided each of which would ground one conductor similar to conductors 1803, 1806 and 1810 to control the alarm sending circuit in the manner to be described, and conductor 1811 to provide a latent local alarm.

Figure 16:
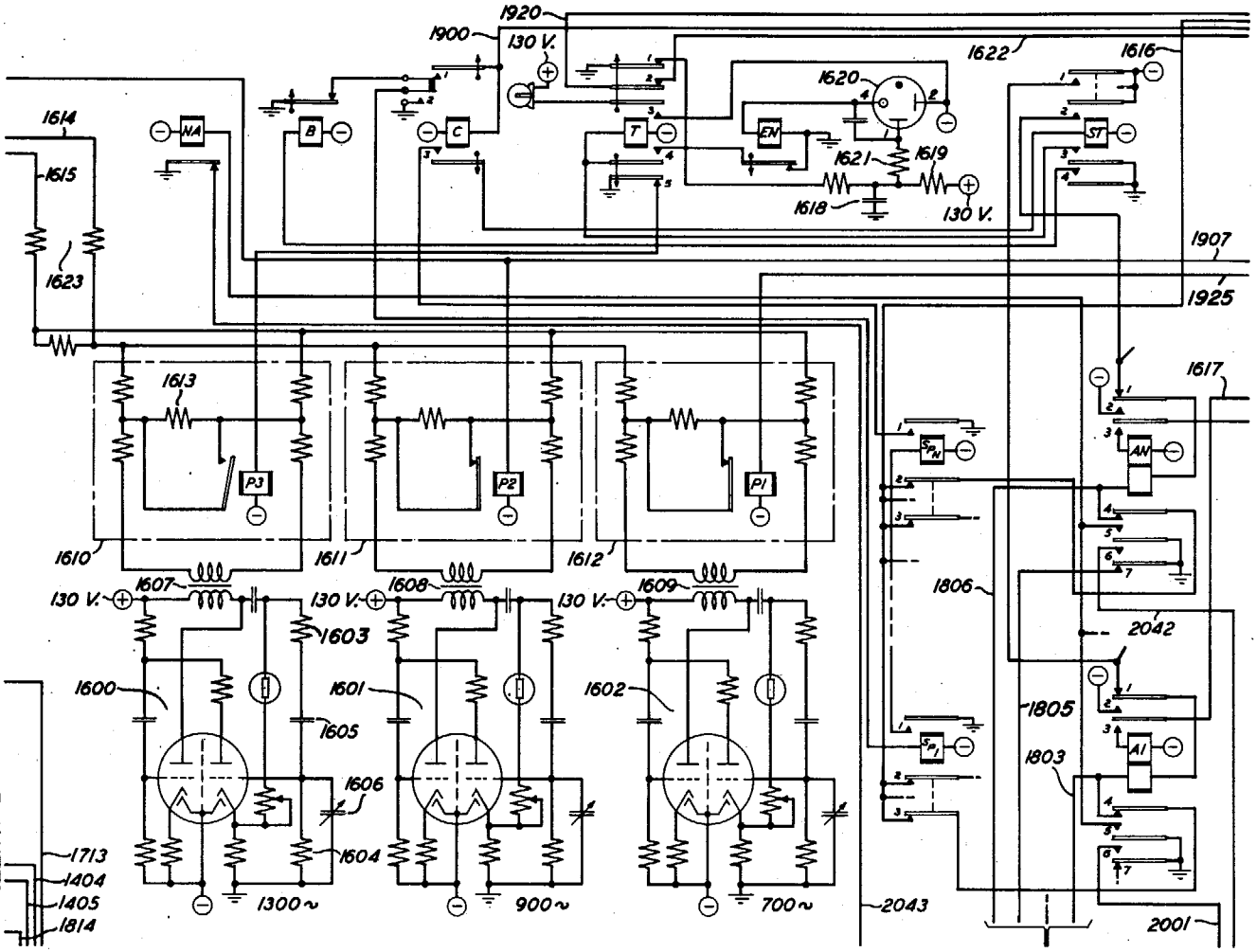
Figure 17:
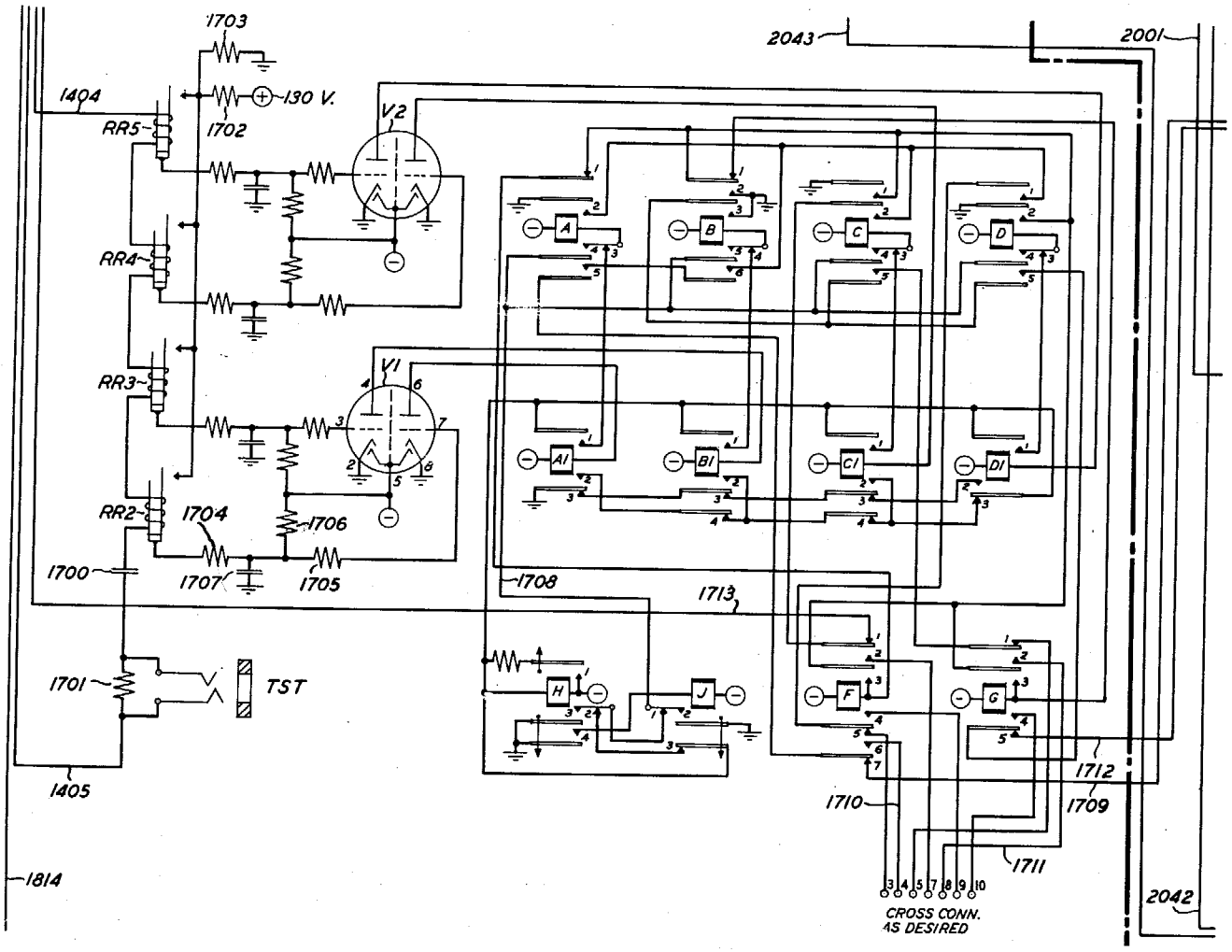

In Fig. 16 are shown three audio frequency oscillators 1600, 1601 and 1602. These oscillators may be of any desired type provided the output remains very constant. Oscillator 1600 is tuned, by the selection of resistances 1603 and 1604 and condensers 1605 and 1606, to a frequency individual to the remote station, which has been assumed to be 1300 cycles. Oscillator 1601 is tuned in a similar manner to a frequency of 900 cycles and oscillator 1602 is tuned to a frequency of 700 cycles. These oscillators are connected through individual transformers 1607, 1608 and 1609 to individual pad circuits 1610, 1611 and 1612 which are connected in multiple to a combining pad circuit 1623 and thence over conductors 1614 and 1615 and through a suitable amplifier 1400 and bridge circuit 1401 to the two-wire west alarm channel 1402.

Each individual pad circuit has a shunt arm such as shown by resistance 1613 of pad 1610 and a relay P3(16), P2(16) or P1(16) which controls a short circuit around the shunt arm. With the shunt arm short-circuited as shown for pads 1611 and 1612 the associated frequency is not transmitted. Relay P3(16) is normally operated in a circuit from ground supplied over contact 5 of relay T(16) holding the short circuit around shunt arm 1613 open so that the 1300-cycle station tone is continuously applied to the two-wire alarm channel 1402.

Each of the subsidiary stations has three such oscillators, one for 900 cycles, one for 700 cycles and one for the station alarm frequency. A typical assignment of alarm frequencies to the stations connected to one alarm channel would be as follows:

Station 1—1300 cycles
Station 2—1700 cycles
Station 3—2100 cycles
Station 4—1900 cycles
Station 5—1100 cycles
Station 6—1500 cycles When one of the alarm circuits operates, for example, the fuse alarm, connecting ground to conductor 1803, a circuit is closed over contact 4 of relay A1(16), a back contact of splitting relay SP1(16), conductor 1616, contact 8 of relay OP(19), conductor 1900 to battery through the winding of relay C(16). Since relay OP(19) is operated whenever an alarm indication is being transmitted as will be described, no alarm can be registered and no alarm signal sent until the alarm indication circuit has completed its cycle. Relay C(16) operates and locks over its contact 1 to ground over the back contact of relay B(16). At its contact 2 relay C(16) connects ground through the winding of relay SP1(16) to battery, operating relay SP1(16) which causes the successive operation of the other splitting relays, ending with relay SPN(16). The splitting relays disconnect all of the alarm conductors 1803, etc. from conductor 1616. Relay SPN(16) closes a circuit from ground over its front contact, contact 3 of relay C(16), to battery through the winding of relay ST(16). Relay ST(16) operates and connects battery to the lower windings of the alarm recording relays A1(16) to AN(16) over a back contact of the respective relays. A circuit is therefore completed from battery over a contact of relay ST(16), contact 1 of relay A1(16) and through its lower winding to ground on conductor 1803. Relay A1(16) operates, closing two locking circuits for itself, one from ground on conductor 1803 through its lower winding to battery over its contact 2, and a second from battery through its upper winding and over its contact 3, conductor 1617 to ground at a back contact of relay AG(19). Therefore, relay A1(16), when operated, remains operated as long as ground is connected to conductor 1803, and also until the indication has been transmitted to the main station as will be described hereinafter. For a blown fuse, conductor 1803 will remain grounded until the fuse is replaced or removed and the indication may be sent out a number of times. However, the thermostats may close only briefly, but since the corresponding alarm recording relay is locked under the control of the indication sending circuit, the indication will be sent out at least once.

Relay A1(16) connects ground to indication conductor 2001 which will be used in transmitting the indication as will be described. In addition it connects ground over its contact 5 to the winding of the no-alarm relay NA(16) and battery, operating relay NA(16) to remove ground from the no-alarm indication conductor 2043.

Relay ST(16) when operated as above described, also closes operating circuits for relays B(16) and T(16). Relay B(16) opens the locking circuit of relay C(16) and relay C(16) releases slowly, opening the circuits for relays ST(16) and SP1(16) so that relays ST(16), SP1(16) to SPN(16) and relay B(16) release in turn. The alarm recording relays are now ready to record other alarms which may occur.

Relay T(16) locks over its contact 4 to ground at the back contact of relay EN(16). At its contact 1, relay T(16) removes ground from condenser 1618 permitting that condenser to start charging from +130-volt battery through resistance 1619. At its contact 2, relay T(16) opens the circuit for relay OP(19) to prevent the indication sending circuit from operating during the alarm signal. At its contact 3, relay T(16) connects +130-volt battery to terminal 2 of gas-filled tube 1620. At its contact 5, relay T(16) opens the circuit of relay P3(16) causing that relay to release to short circuit the shunt arm 1613 of pad 1610 and remove the 1300-cycle current from the two-wire alarm channel 1402.

Condenser 1618 is connected through resistance 1621 to terminal 1 of tube 1620 and relay EN(16) is connected between ground and terminal 4 of tube 1620. When condenser 1618 has charged to the breakdown potential of tube 1620, the tube becomes conducting and relay EN(16) operates, opening the locking circuit of relay T(16) which releases, reoperating relay P3(16) to cause the 1300-cycle current to again flow over channel 1402. Condenser 1618 and resistance 1619 are chosen to measure the desired time interval which may be, for example, 10 seconds. Relay T(16), when released, again shunts condenser 1618 and disconnects +130-volt battery from the tube to quench the tube and release relay EN(16).

The alarm sending circuit is now normal and the operation of another alarm would cause a repetition of the alarm sending operations. If two alarm conditions occur simultaneously, the operations are the same as described except that two relay like relay A1(16) are operated and locked. If staggered alarm conditions occur during the timing cycle, the corresponding alarm recording relays operate but are ineffective to cause a recycle of the alarm sending circuit.

Alarm receiving

At the main or attended station the West alarm channel 1402 is connected by means of bridging circuit 1500 and amplifier 1501 to conductors 1502 and 1503 which are connected through repeating coil 1200 in multiple to a plurality of filters 1201 and 1100 to 1105. These filters are turned to 900 cycles, 1300 cycles, 1700 cycles, 2100 cycles, 1900 cycles, 1100 cycles and 1500 cycles respectively. Filter 1202, tuned to 70 cyces, is normally connected in multiple with the other filters to the west alarm channel over contacts 1 and 4 of transfer relay T (12).

Each of these filters is connected to an individual receiving circuit such as receiver 1106. Filters 1100 to 1105 and their associated receivers, which are individual to the various remote stations, receive the station alarms and are continuously energized except when the tone is interrupted at the remote station to indicate an alarm. Filters 1201 and 1202 and their associated receivers are used for alarm or indication receiving and their function will be described hereinafter.

Receiver 1106 includes a pentode amplifier tube 1107, the output of which is coupled by transformer 1118 to a bridge type rectifier 1119 which rectifies the amplified tone signal. The output of rectifier 1119 is applied to the upper winding of relay P1(11) which is polarized by a circuit through its lower winding. While the signal tone is being received, relay P1(11) holds its contact 1 closed, connecting ground to conductor 1108. When the signal tone is interrupted as an alarm signal the polarizing winding of relay P1(11) causes it to remove ground from conductor 1108 and connect it to conductor 1109.

Figure 8:
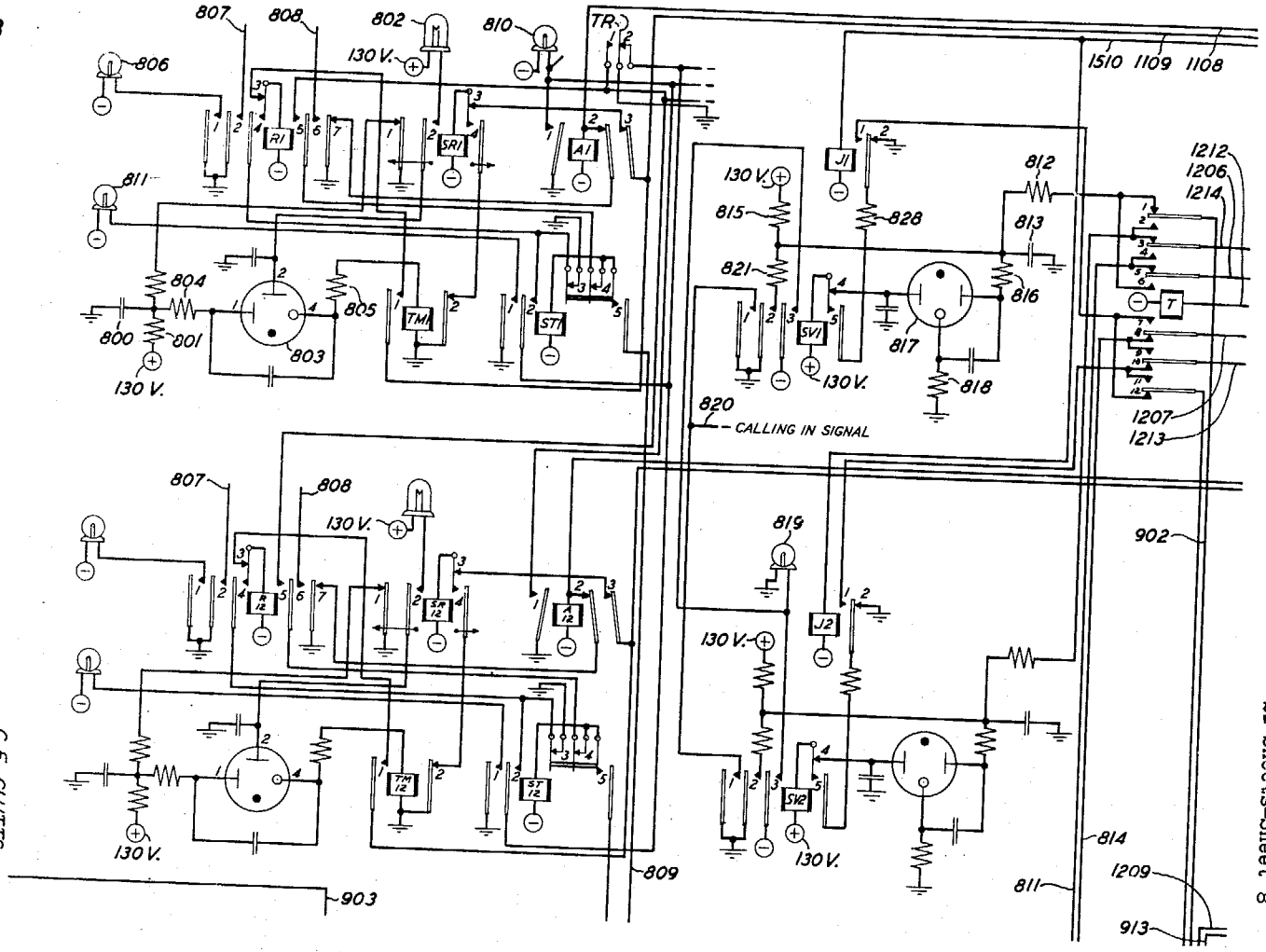
Figure 9:
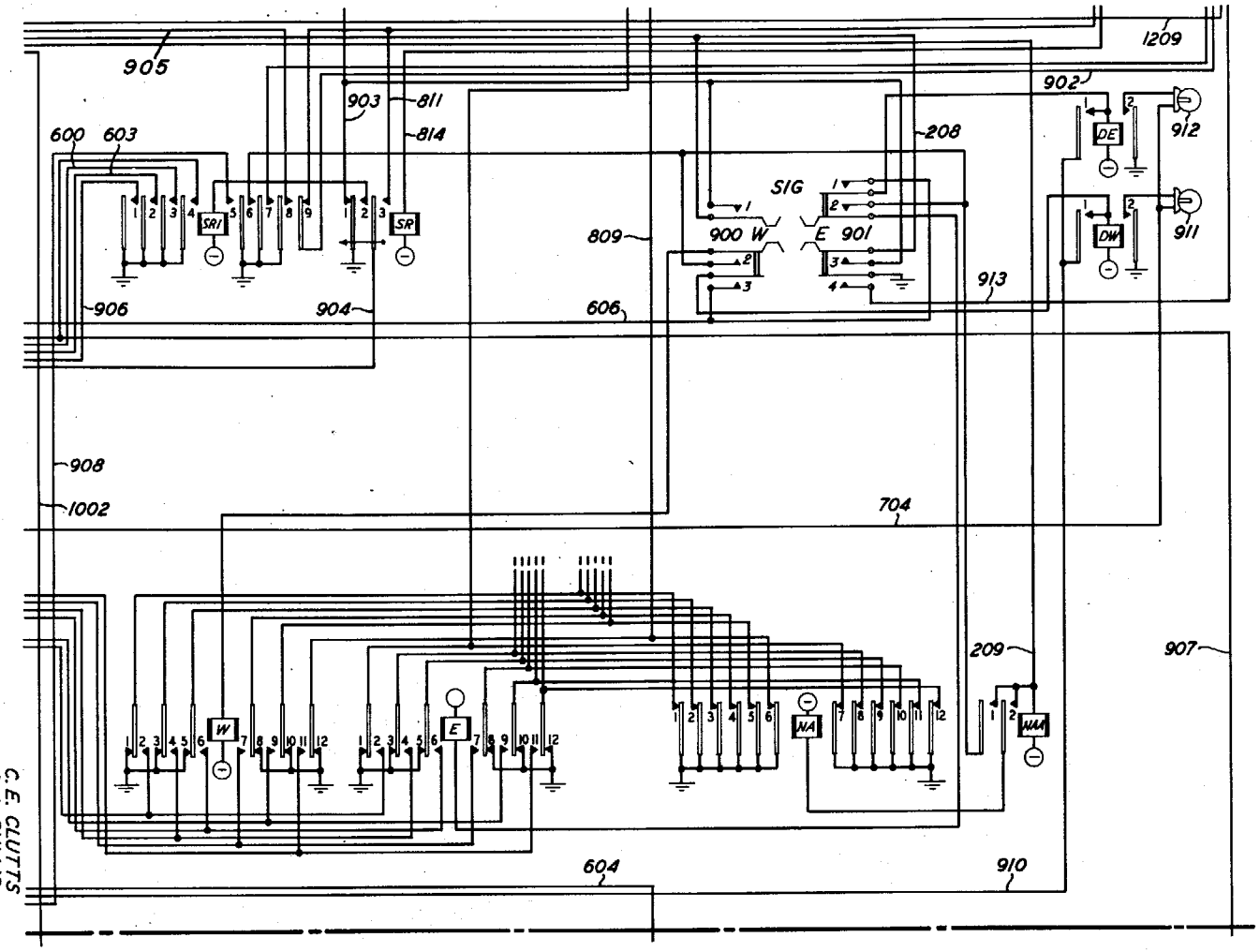
Figure 10:
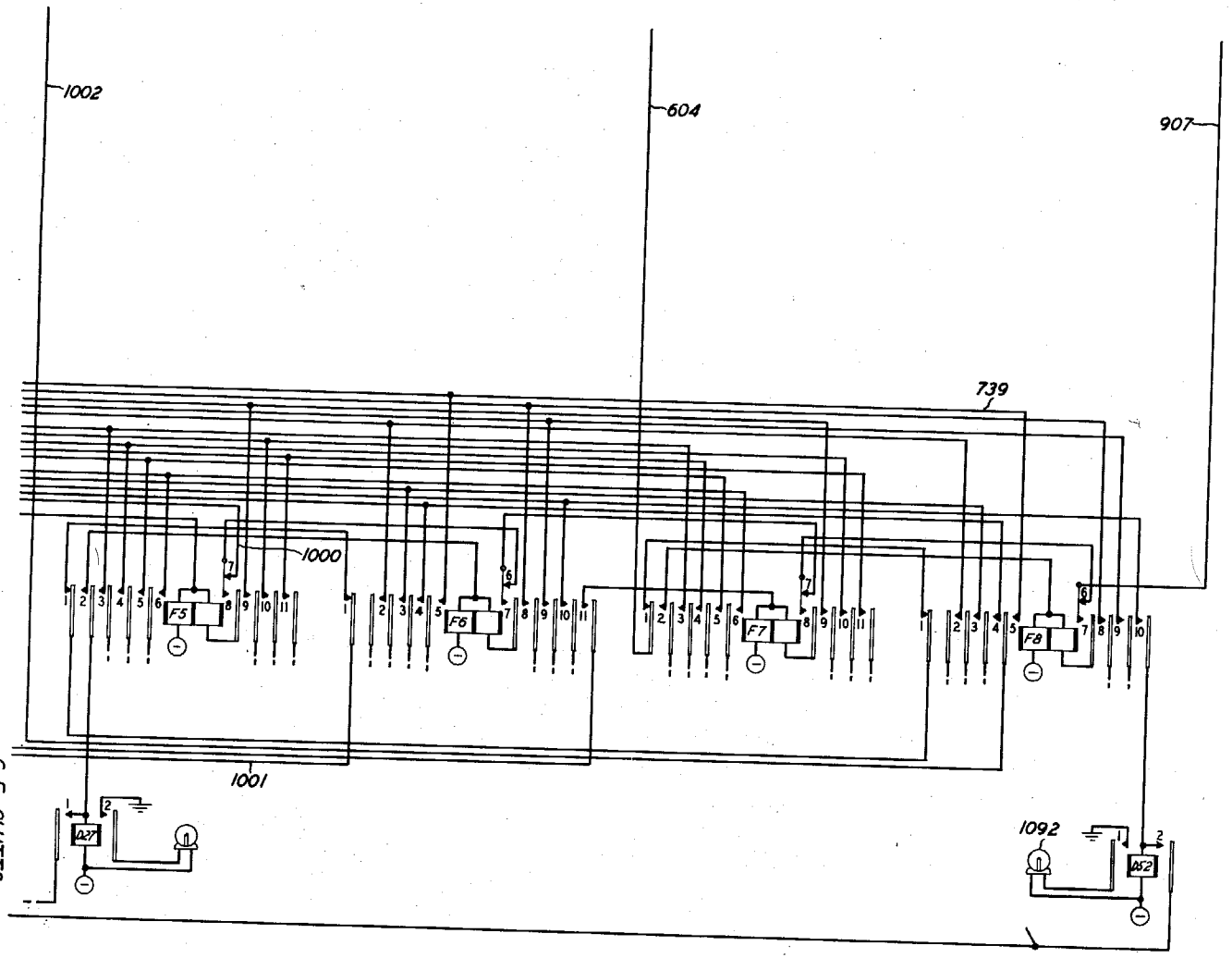
Figure 11:
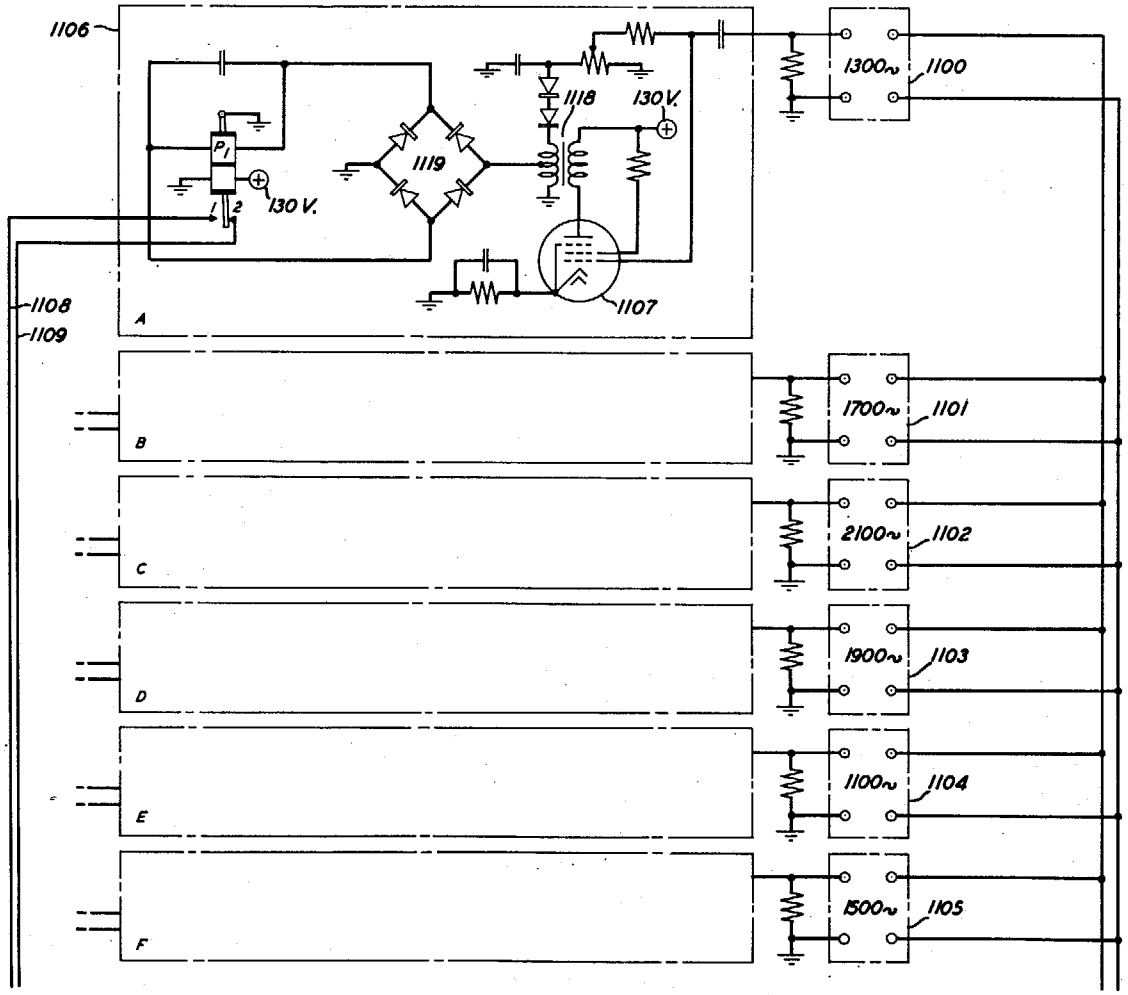
Figure 12:
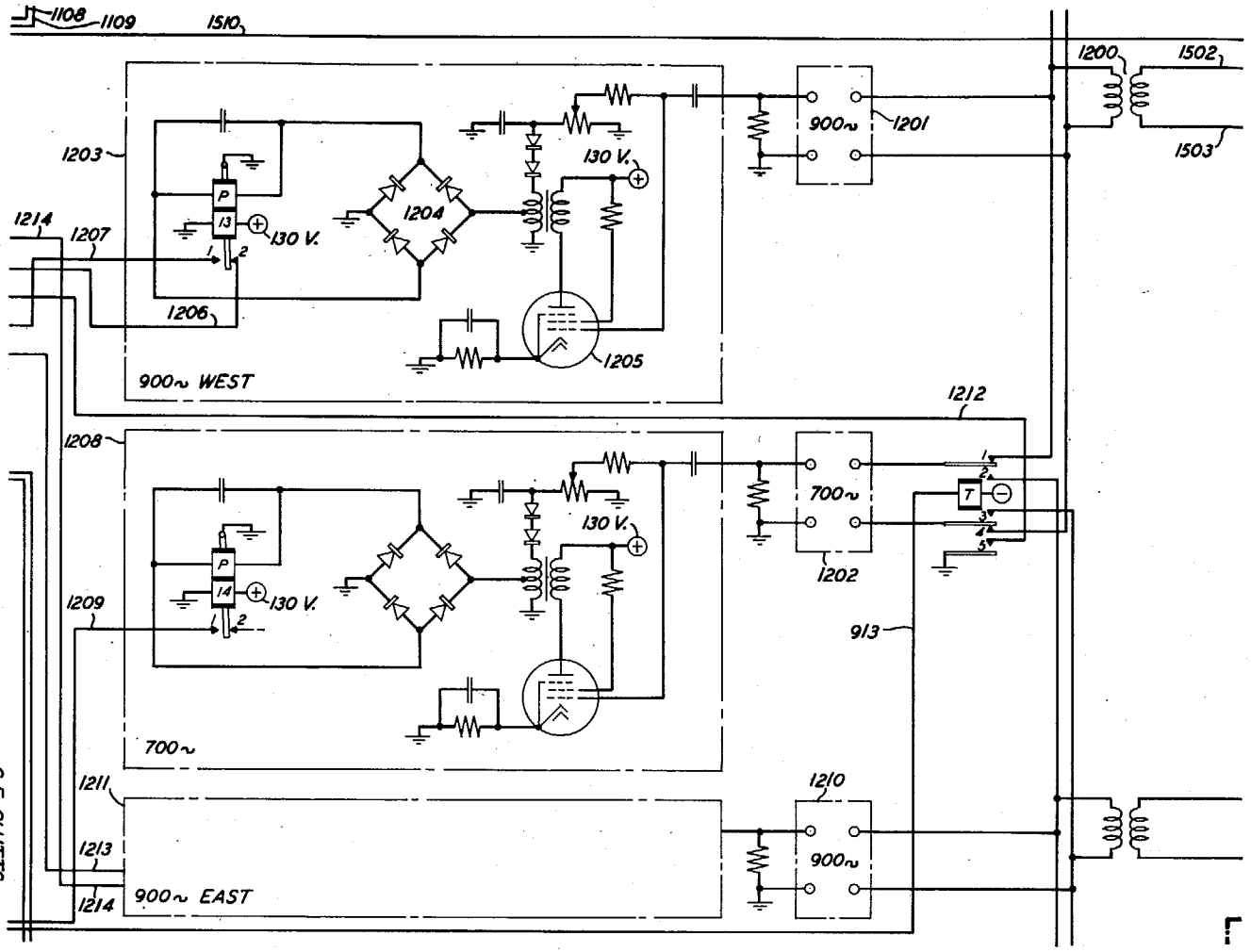
Figure 13:
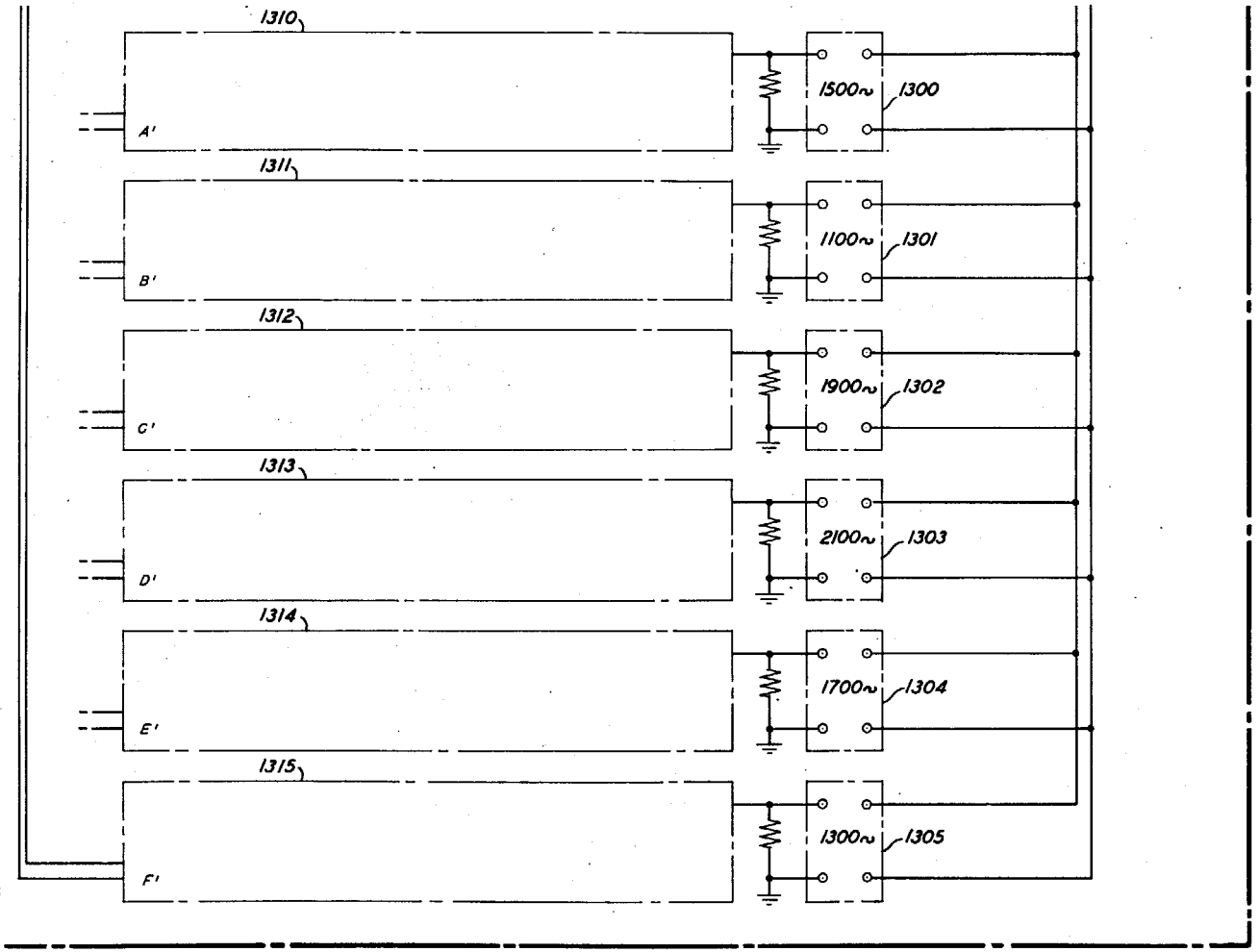
Figure 14:
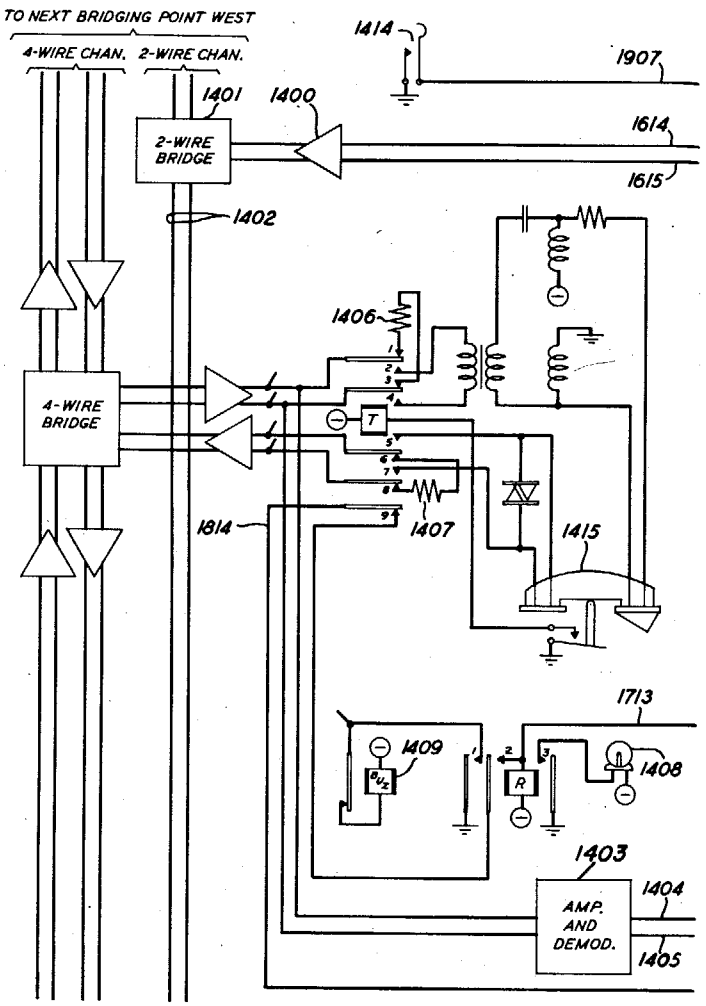
Figure 15:
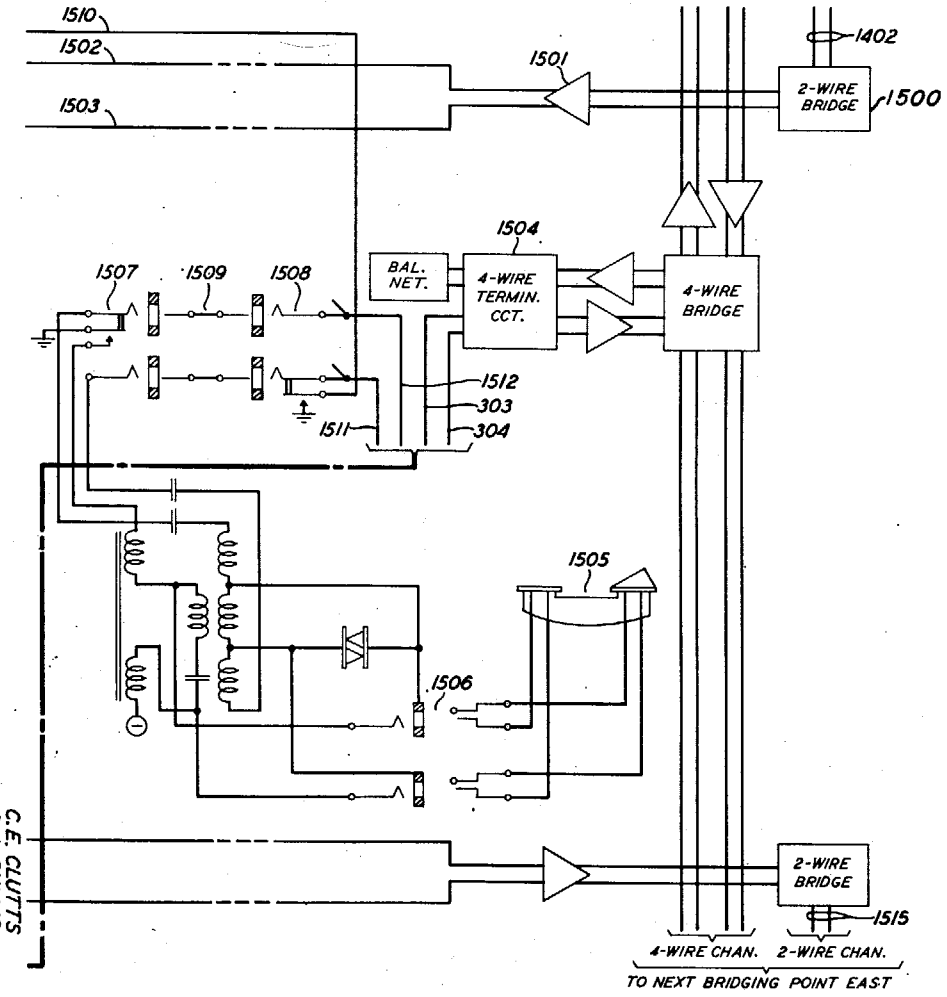

Each receiver is connected to an individual alarm registering circuit such as those shown in Fig. 8 so that alarms at a plurality of stations may be registered simultaneously. Since ground is normally connected to conductor 1108, relay A1(8) is normally held operated and locked to ground at contact 7 of relay R1(8). When the 1300-cycle signal tone is interrupted, removing ground from conductor 1108, relay A1(8) does not release being locked to relay R1(8), but ground connected to conductor 1109 completes a circuit over contact 3 of relay A1(8), contact 3 and winding of relay SR1(8) to battery, operating relay SR1(8) which locks to ground over contact 2 of relay TM1(8). Relay SR1(8) at its contact 1 removes ground from condenser 800 which starts to charge from +130 volts through resistance 801. At its contact 2, relay SR1(8) connects +130 volts through resistance lamp 802 to terminal 2 of tube 803. Condenser 800 is connected through resistance 804 to terminal 1 of tube 803 and relay TM1(8) is connected through resistance 805 to terminal 4 of tube 803. When condenser 800 has received a sufficient charge, tube 803 breaks down and relay TM1(8) operates.

Condenser 800 and resistance 801 are so chosen that the time interval measured will be greater than any transient conditions likely to occur but shorter than the interruption caused by an alarm signal. For an alarm signal, ground will still be connected to conductor 1109 when relay TM1(8) operates, completing a circuit over contact 1 of relay TM1(8), contact 3 and winding of relay R1(8) to battery. Relay R1(8) operates, locking over its contact 4 and contact 3 of relay ST1(8) to ground. At its contact 1, relay R1(8) lights lamp 806, individual to the office sending the alarm, and at its contacts 2 and 6 grounds conductors 807 and 808 to operate a visual and audible alarm.

Relay R1(8) also opens the locking circuit for relay A1(8) permitting that relay to release and light lamp 810. Relay TM1(8) in operating opens the locking circuit of relay SR1(8) which releases after an interval. With relay SR1(8) released, ground is again connected to condenser 800 and +130-volt battery is disconnected from tube 803 quenching the tube and releasing relay TM1(8). At the end of the alarm interval relay P1(11) removes ground from conductor 1109 and connects it to conductor 1108, reoperating relay A1(8).

To silence the audible alarm the attendant may operate non-locking key TR(8) closing a circuit from ground over contact 1 of key TR(8), contact 5 of relay R1(8), contact 4 and winding of relay ST1(8) to battery. Relay ST1(8) operates in this circuit and locks over its contact 5, conductor 809 to ground at contact 12 of relay W(9) and contact 7 of relay NA(9). Relay ST1(8) in operating, opens the locking circuit for relay R1(8) which thereupon releases extinguishing lamp 806 and removing ground from conductors 807 and 808 to silence the audible alarm. At its contact 1, relay ST1(8) lights lamp 811, also individual to the office sending the alarm. Relay ST1(8) will remain operated and lamp 811 lighted until both relays W(9) and NA(9) associated with the indication scanning circuit have been operated and proper combination of relays S1, S2 and S3 for station 1 west have operated.

If another alarm comes in from this station before relay ST1(8) has been released, relays SR1(8), TM1(8) and R1(8) operate and relay A1(8) releases as above described. With relay ST1(8) operated, relay R1(8) locks over its contact 4, and contact 2 of relay ST1(8) to ground at contact 2 of key TR(8). Relay R1(8) again lights lamp 806, which, with lamp 811 lighted, indicates a second alarm. Operating key TR(8) releases relay R1(8) and leaves the alarm registering circuit in condition to register subsequent alarms.

Order transmission

The attendant, determining from lighted lamp 806 the station at which a trouble has occurred, now transmits an order to that station to send in an indication of the nature of the trouble. For the purpose of sending orders to the various remote stations, the main station is provided with a set of station keys STA1(2) to STA12(5), one for each remote station associated with the main station, and a set of order keys ORD1(2) to ORD10(5). Of the order keys ORD1(2) to ORD10(5), key ORD1(2) is used for causing the remote station to send an indication, key ORD6(2) is used for initiating a test indication and key ORD2(2) is used as a calling-in signal. Other orders may be used to control the automatic starting or stopping of equipment at the remote station such as starting or stopping a generator, or for other purposes.

Figure 3:
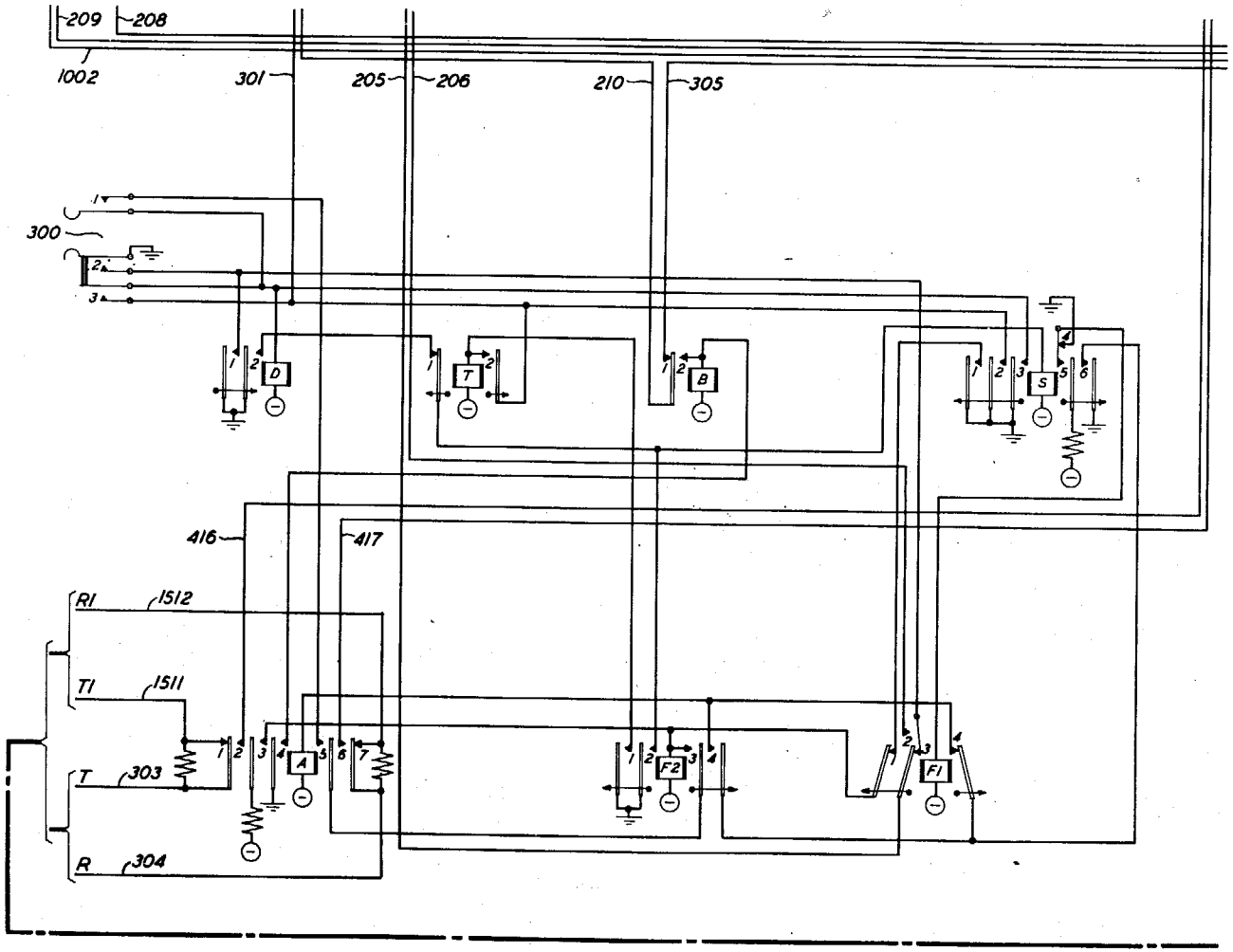
Figure 4:
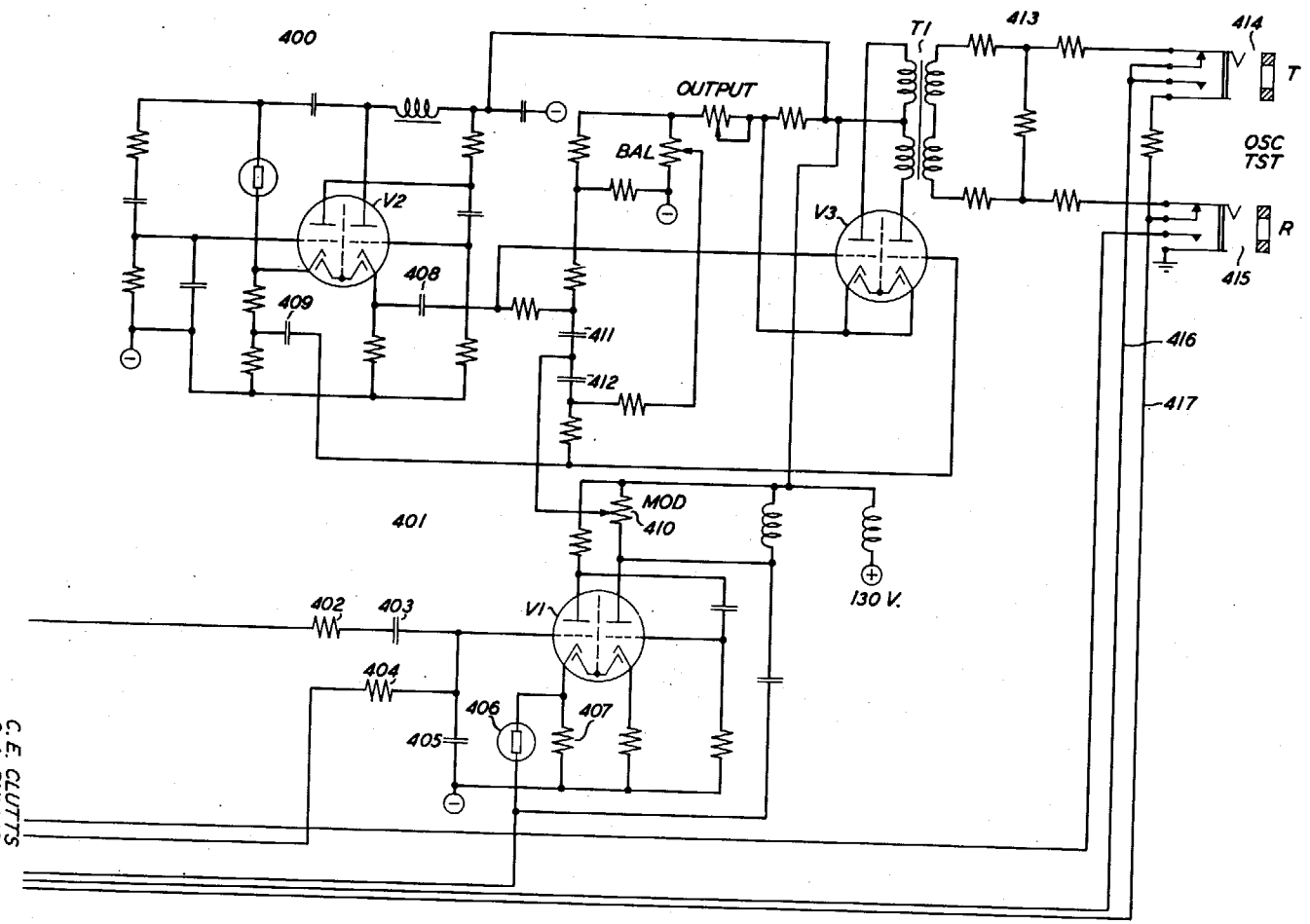
Figure 5:
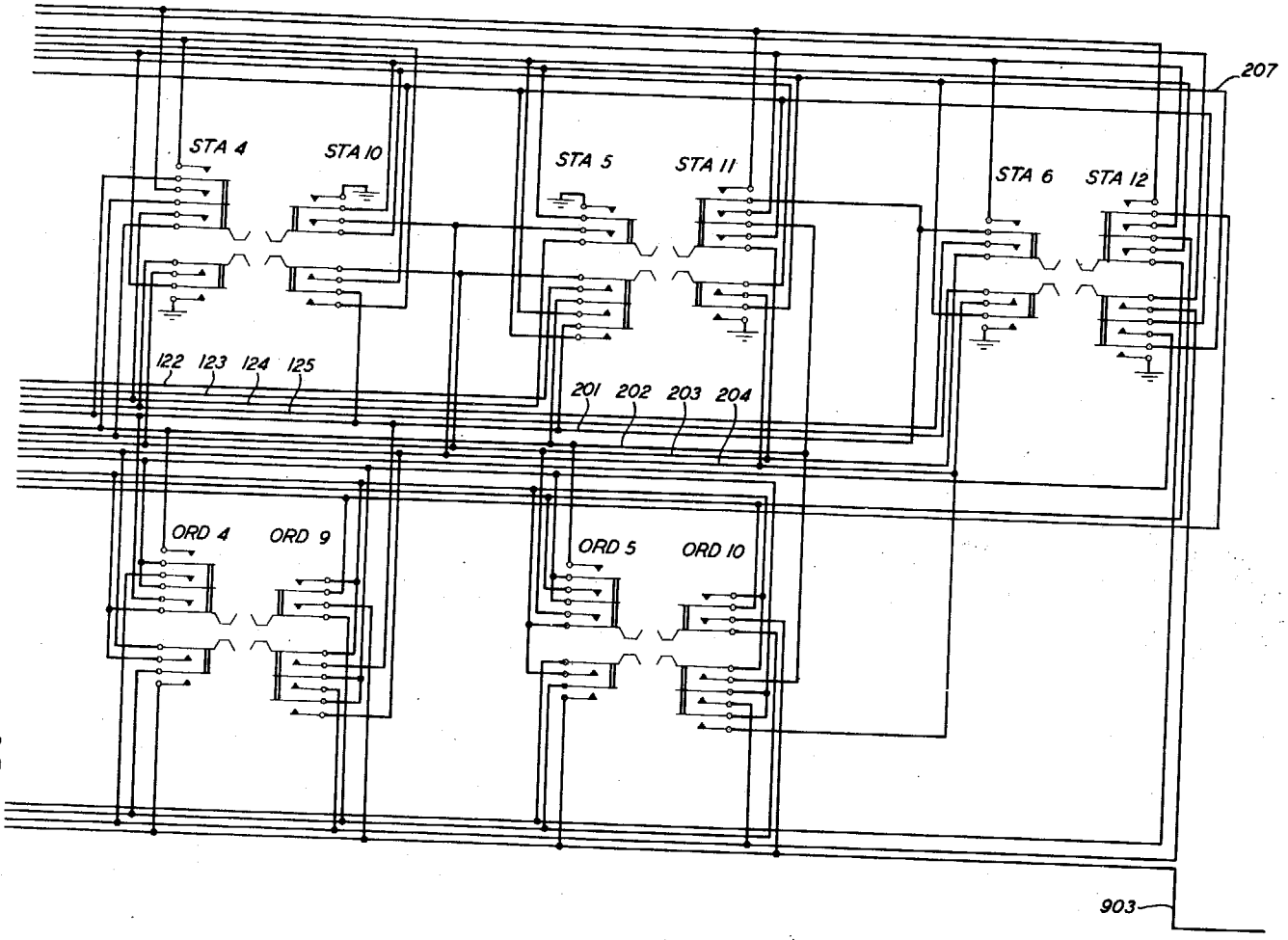
Figure 6:
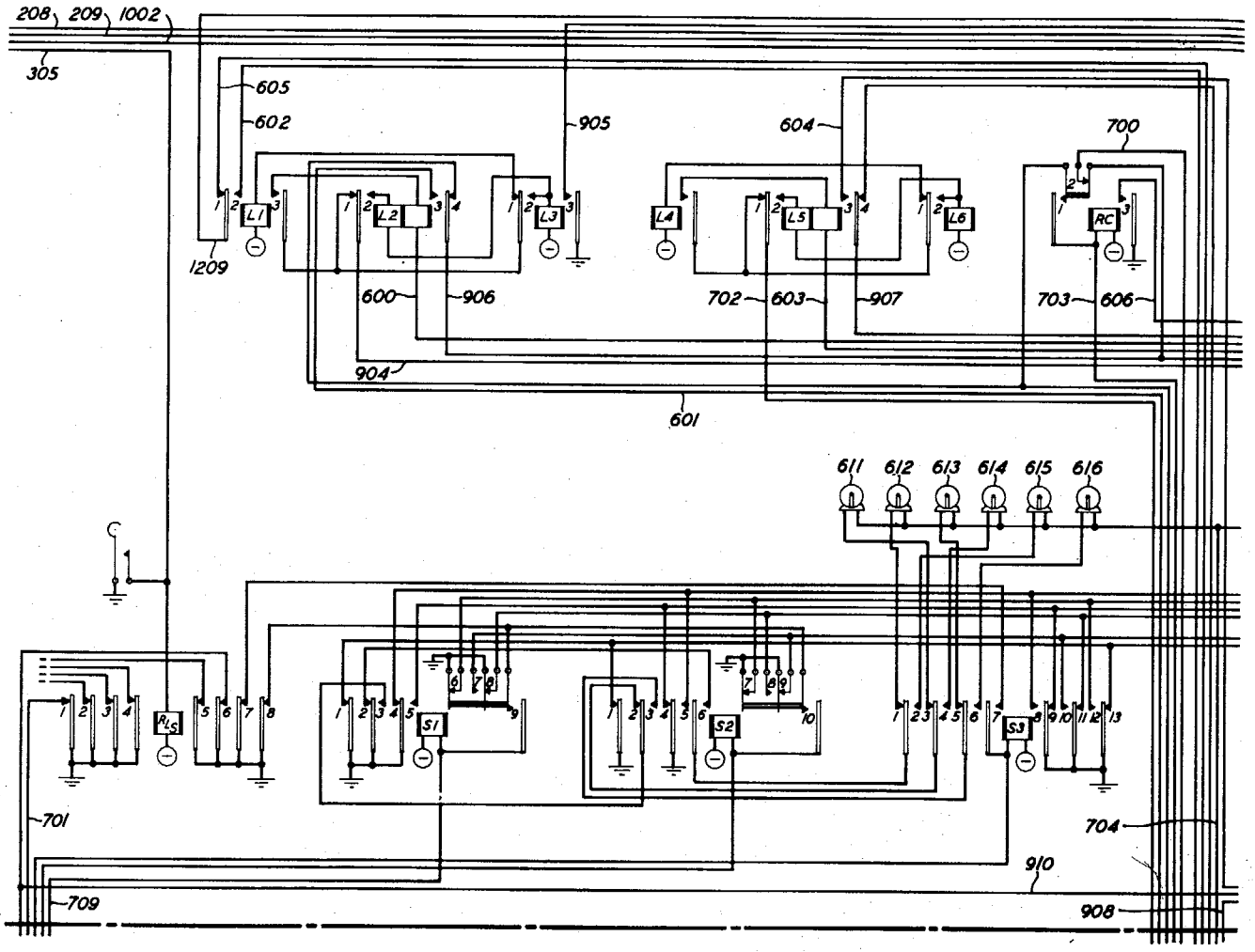
Figure 7:
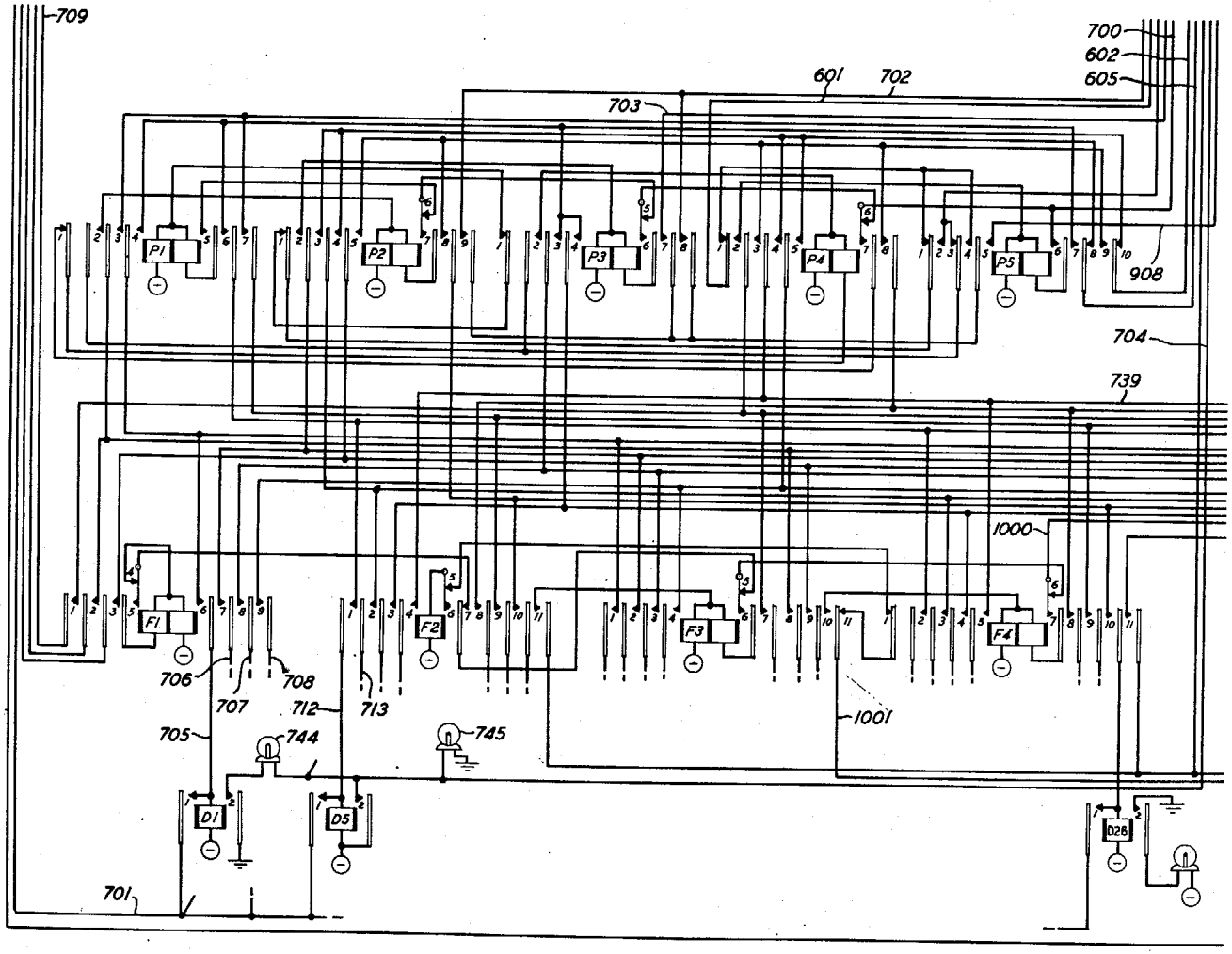

These keys and the associated sending director circuit of Fig. 3 are arranged to transmit 120 permutations of two sequential audio frequency tones from twelve frequency sources, which permutations of two sequential audio frequency tones from twelve frequency sources, which permutations vary not only as to the combinations of frequencies used but the order in which they are used. These permutations are used in twelve groups of ten each, to permit ten orders to be sent to each of twelve unattended or remote stations, whereby each permutation represents a particular order to a particular station.

In order to minimize the amount of equipment required at any one remote station, the permutations are so grouped that those used by one station, in general, employ only four frequencies. If a full quota of twelve stations is served, the twelfth station uses five frequencies. Designating the twelve frequencies by numbers, the frequencies used by the various stations and the order in which the frequencies are effective are as follows:

| Station | Frequencies used |
|---|---|
| 1 | 2, 3, 4, 5 |
| 2 | 6, 7, 4, 5 |
| 3 | 8, 9, 4, 5 |
| 4 | 10, 11, 4, 5 |
| 5 | 6, 8, 2, 3 |
| 6 | 12, 1, 4, 5 |
| 7 | 7, 9, 2, 3 |
| 8 | 10, 12, 2, 3 |
| 9 | 11, 1, 2, 3 |
| 10 | 10, 1, 6, 7 |
| 11 | 11, 12, 6, 7 |
| 12 | 11, 12, 8, 9, 6 |

The permutations used for each order at a typical one of stations 1 to 11, for example, for station 1, are as follows:

| Order No. | Frequencies used |
|---|---|
| 1 | 2–3 |
| 2 | 2–4 |
| 3 | 2–5 |
| 4 | 3–2 |
| 5 | 3–4 |
| 6 | 3–5 |
| 7 | 4–2 |
| 8 | 4–3 |
| 9 | 5–2 |
| 10 | 5–3 |

The permutations used for the ten orders to station 12 are as follows:

| Order No. | Frequencies used |
|---|---|
| 1 | 12–11 |
| 2 | 6–9 |
| 3 | 6–11 |
| 4 | 11–12 |
| 5 | 8–9 |
| 6 | 8–11 |
| 7 | 9–8 |
| 8 | 11–6 |
| 9 | 11–8 |

The order signals transmitted consist of a voice frequency tone of 1600 cycles modulated in sequence by two low frequency tones in the range of 277.5 cycles to 442.5 cycles. The 1600-cycle frequency is generated by oscillator 400, which is composed of tube V2(4) and its associated components. The modulating frequency is generated by oscillator 401 which is composed of tube V1 and its associated components. This oscillator is of the bridge type, with condensers and resistors in all the arms. The first arm is composed of resistances 100 to 110 and 402 in series with condenser 403; the second arm is composed of resistances 111 to 121 and 404 in parallel with condenser 405, the third arm contains thermistor 406, while the fourth arm contains resistance 407. The resistance and capacitance in the first and second arms determine the frequency of the output of the oscillator. With none of the relays F2(1) to F12(1) operated the oscillator generates a frequency of 277.5 cycles. With one of the relays F2(1) to F12(1) operated, one or more of the resistances is removed from each of the first and second arms, thereby altering the frequency generated by the oscillator.

The frequencies generated as a result of operating a particular one of relays F2(1) to F12(1) are as follows:

| Relay Operated | Frequency Number | Frequency in Cycles |
|---|---|---|
| None | 1 | 277.5 |
| F2(1) | 2 | 292.5 |
| F3(1) | 3 | 307.5 |
| F4(1) | 4 | 322.5 |
| F5(1) | 5 | 337.5 |
| F6(1) | 6 | 352.5 |
| F7(1) | 7 | 367.5 |
| F8(1) | 8 | 382.5 |
| F9(1) | 9 | 397.5 |
| F10(1) | 10 | 412.5 |
| F11(1) | 11 | 427.5 |
| F12(1) | 12 | 442.5 |

The outputs of high frequency oscillator 400 and low frequency oscillator 401 are combined by means of modulator tube V3(4) and its associated components. Two equal voltages, 180 degrees out of phase, are delivered by oscillator 400 through blocking condensers 408 and 409 to the input of modulator tube V3(4). A portion of the low frequency oscillator output is obtained from the modulating potentiometer 410 and is fed to the mid-point of the modulator input through condensers 411 and 412. This voltage varies the instantaneous bias on the grids of both halves of tube V3(4) simultaneously, thus varying the gain of both sections and modulating the voice frequency.

The output of modulator V3(4) is fed through transformer T1(4), balanced attenuator 413, and the oscillator test jacks 414 and 415 to conductors 416 and 417.

Assuming that the remote station shown in station 1, the attendant will operate station key STA1(2) and order key ORD1(2). With key STA1(2) operated the circuits of relays F2(1), F3(1), F4(1) and F5(1) are extended over conductors 122, 123, 124 and 125, and contacts 5, 4, 3 and 2 of key STA1(2) to conductors 201 to 204. With order key ORD1(2) operated conductor 201 is connected over contact 1 of key ORD1(2) to the first frequency conductor 205 while conductor 202 is connected over contact 3 of key ORD1(2) to the second frequency conductor 206 in preparation for sending the indication order. Whenever one of the station keys is operated, ground is connected to conductor 207 to light lamp 200.

Before operating start key 300 to initiate the transmission of the order, it is also necessary to operate either west key 900 or east key 901 to control certain functions which will be described later. Since the office shown in detail is represented as bridged to the west alarm line 1402, west key 900 must be operated.

Start key 300 may now be operated, closing a circuit from battery through the winding of relay D(3), contact 3 of key 300, conductor 301, contact 6 of key ORD1(2), conductor 208, contact 1 of west key 900, to ground at contact 1 of relay SR(9). Since relay SR(9) is operated whenever the indication scanner is functioning, as will be described hereafter, it will be apparent that an indication order cannot be sent unless the indication circuits are not operating.

When relay D(3) finally operates, it closes a circuit from ground over its contact 2 and contact 1 of relay T(3) to battery through the winding of relay S(3), operating the latter relay. Relay F1(3) is normally operated in a circuit from battery through its winding to ground over contact 4 of relay S(3). Therefore, as soon as key 300 is operated, a circuit is closed from ground over contact 2 of key 300, contact 3 of relay F1(3), conductor 205, contact 1 of order key ORD1(2), conductor 201, contact 5 of station key STA1(2), conductor 122 to battery through the winding of relay F2(1). The operation of relay F2(1) adjusts the frequency of the oscillator 401 to the frequency 2. Relay D(3) at its contact 1 supplements the ground furnished by key 300.

Relay S(3) in operating opens its contact 4 to start the release of slow-to-release relay F1(3) and at its contact 3 closes a holding circuit for relay D(3). In addition, relay S(3) closes a circuit from ground over its contact 1, contact 1 of relay F1(3) to battery through the winding of relay F2(3) and a circuit from ground over its contact 6, contact 4 of relay F1(3) to battery through the winding of relay A(3). Relays F2(3) and A(3) operate, relay F2(3) closing a supplementary circuit from ground over contact 6 of relay S(3), contact 4 of relay F2(3) to battery through the winding of relay A(3). Relay F2(3) also connects ground over its contact 2 to battery through the winding of relay S(3) to hold that relay operated.

Relay A(3) in operating connects conductors 416 and 417, to which the signal frequency is connected as previously described, over its contacts 2 and 6 to conductors 303 and 304 and thence through the four-wire terminating circuit 1504 to the four-wire channel.

After an interval, relay F1(3) releases, opening the circuit of relay F2(1) and closing a circuit from ground at contact 2 of key 300 or contact 1 of relay D(3), contact 2 of relay F1(3), second frequency conductor 206, contact 3 of key ORD1(2), conductor 202, contact 4 of key STA1(2), conductor 123, to battery through the winding of relay F3(1) to change the frequency generated by oscillator 401 to frequency 3.

The start key 300 is normally operated only momentarily and would be released by this time, so that the release of relay F1(3) opens the circuit of relay F2(3), which relay, in turn, releases slowly to cause relay A(3) to release after an interval and terminate the application of the second frequency to the four-wire channel.

When relay F2(3) operates, it closes a circuit for relay T(3) which operates and locks over its contact 2 and conductor 301 to ground as above traced at the same time opening the circuit of relay S(3). When relay F2(3) releases, relay S(3) in turn releases slowly. With relay S(3) released, relay D(3) is also released, and relay F1(3) reoperated to prepare the order sending circuit to send another order. However, since relay T(3) which is locked under the control of key ORD1(2), holds the operating circuit of relay S(3) open, a second order cannot be sent without restoring key ORD1(2).

If the start key 300 is held operated, relay F2(3) locks over its contact 3, contact 5 of relay A(3), contact 1 of key 300 to ground at contact 3 of relay S(3), and the second frequency continues to be sent until key 300 is released.

Receiving order

The pulse of 1500-cycle current modulated first by frequency 2 and then by frequency 3, transmitted over the four-wire channel is received at each of the unattended stations by means of an amplifying and demodulating circuit such as indicated at 1403. The output of the demodulator is connected to the windings of four tuned-reed selectors in series at each of eleven unattended stations and to the windings of five tuned-reed selectors in series at the twelfth station.

At the unattended station shown and assumed to be station 1 the output of demodulator 1403 is connected over conductor 1404 and 1405 through the windings of reed selectors RR5(17), RR4(17), RR3(17) and RR2(17) in series with condenser 1700 and resistance 1701. In accordance with the table given above, frequencies 2, 3, 4 and 5 are used in giving orders to station 1 and reed selectors RR2(17), RR3(17), RR4(17) and RR5(17) are therefore tuned to frequencies 2, 3, 4 and 5 respectively.

Therefore when current of frequency 2 is received, reed selector RR2(17) goes into mehcanical oscillation, closes its contacts once per cycle of the received frequency and intermittently connects high positive potential from the potentiometer made up of resistances 1702 and 1703, to a network made up of resistances 1704, 1705 and 1706 and condenser 1707 which is connected to grid 7 of vacuum tube V1(17). This grid is normally held at cut-off by negative battery connected thereto through resistances 1706 and 1705, so that relay A1(17) is released.

The left half of tube V1(17) and the two halves of tube V2(17) are similarly biased and connected to the contacts of reed selectors RR3(17), RR4(17) and RR5(17). Relays B1(17), C1(17) and D1(17) are connected to the plate circuits of the left half of tube V1(17) and the right and left halves of tube V2(17) respectively.

As the reed selector RR2(17) vibrates, the bias voltage on grid 7 will become less negative and current will flow through the plate circuit of the right half of tube V1(17), causing relay A1(17) to operate, thus recognizing the receipt of frequency 2.

With relay A1(17) operated, a circuit is closed from ground over contact 2 of relay A1(17), contact 4 of relay B1(17), contact 4 of relay C1(17), contact 3 of relay D1(17), and thence in parallel over contact 1 of relay A1(17), contact 3 and winding of relay A(17) to battery, and through the winding of relay H(17) to battery. Relays A(17) and H(17) operate in this circuit. Relay H(17) closes a temporary locking circuit for relay A(17) which may be traced from battery through the winding of relay A(17) over its contact 4, conductor 1708, contact 1 of relay J(17), contact 3 of relay H(17) to ground. Relay H(17) also closes an obvious circuit for relay J(17) which operates and, at its contact 2, connects ground to conductor 1708 to hold relay A(17) operated.

When the frequency 2 is removed and frequency 3 applied, reed selector RR2(17) ceases to vibrate and reed selector RR3(17) starts to vibrate, causing relay A1(17) to release and relay B1(17) to operate. With relay B1(17) operated, a circuit is closed from ground over contact 3 of relay A1(17), contact 2 of relay B1(17), contact 4 of relay C1(17), contact 3 of relay D1(17), and thence in parallel over contact 1 of relay B1(17), contact 4 and winding of relay B(17) to battery, and through the winding of relay H(17) to battery. Relay H(17) is slow to release and therefore remains operated over the interval between the release of relay A1(17) and the operation of relay B1(17). Relay B(17) operates and locks over its contact 5 to conductor 1708.

With relays A(17) and B(17) operated, a circuit is closed from ground over contact 2 of relay A(17), contact 6 of relay B(17), contact 5 of relay A(17), contact 7 of relay F(17), conductor 1709, contacts 3 of relay RLS(19), conductor 1920, contact 2 of relay T(16), conductor 1622(19) to battery through the winding of relay OP(19). It will be noted that this circuit extends over the back contact of relay T(16) so that relay OP(19) may not operate if the alarm sending circuit is in process of sending an alarm signal. Relay OP(19) when operated, in turn operates relay SO(19) which operates after an interval and closes a locking circuit for relay OP(19) which may be traced from battery through the winding of relay OP(19) to conductor 1709 as above traced and thence over contact 6 of relay SO(19) to ground at contact 1 of relay OP(19). With relay OP(19) operated, the circuit of relay C(16) is opened and no subsequently arising alarm can cause an alarm signal to be sent until the alarm indication has been completed.

When the order tone terminates, relay B1(17) releases in turn releasing relay H(17) and relay J(17). When relay J(17) releases, relays A(17) and B(17) also release.

Relays F(17) and G(17) are used to assist in the translation of orders, particularly in recognizing the sequence of operation. For example, as shown in the previous table, order 4 uses the same frequencies as order 1 but in the reverse sequence. The first frequency therefore operates relay B1(17) in turn operating relay B(17). With relay B(17) operated and relay A(17) not operated, a circuit is closed from ground over contact 2 of relay B(17), contact 1 of relay A(17) to battery through the winding of relay F(17). Relay F(17) operates and locks over its contact 3 and contact 2 of relay B(17) independent of relay A(17). The second frequency then operates relay A1(17), which in turn operates relay A(17).

Since relay F(17) is operated, the operation of relay A(17) closes a circuit from ground over its contact 2, contact 6 of relay B(17), contact 5 of relay A(17), contact 6 of relay F(17) to conductor 1710 which is cross-connected to carry out the operation corresponding to order 4.

If either relay C(17) or D(17) is operated first, for example, in response to order 8, a circuit is closed from contact 1 of relay C(17), over contact 1 of relay B(17) to batery through the winding of relay G(17), relay G(17) locking under the control of the relay C(17) independent of relay B(17). A circuit is also closed from ground over contact 1 of relay C(17) and contact 1 of relay A(17) to battery through the winding of relay F(17) which also locks under the control of relay C(17). Relay D(17) operated first, also operates both relays F(17) and G(17). For order 8, relay B(17) is operated by the second frequency and a circuit is closed from ground over contact 3 of relay B(17), contact 5 of relay C(17), contact 2 of relay G(17) to conductor 1711 which is cross-connected to equipment for carrying out order 8.

Indication sending

Figure 19:
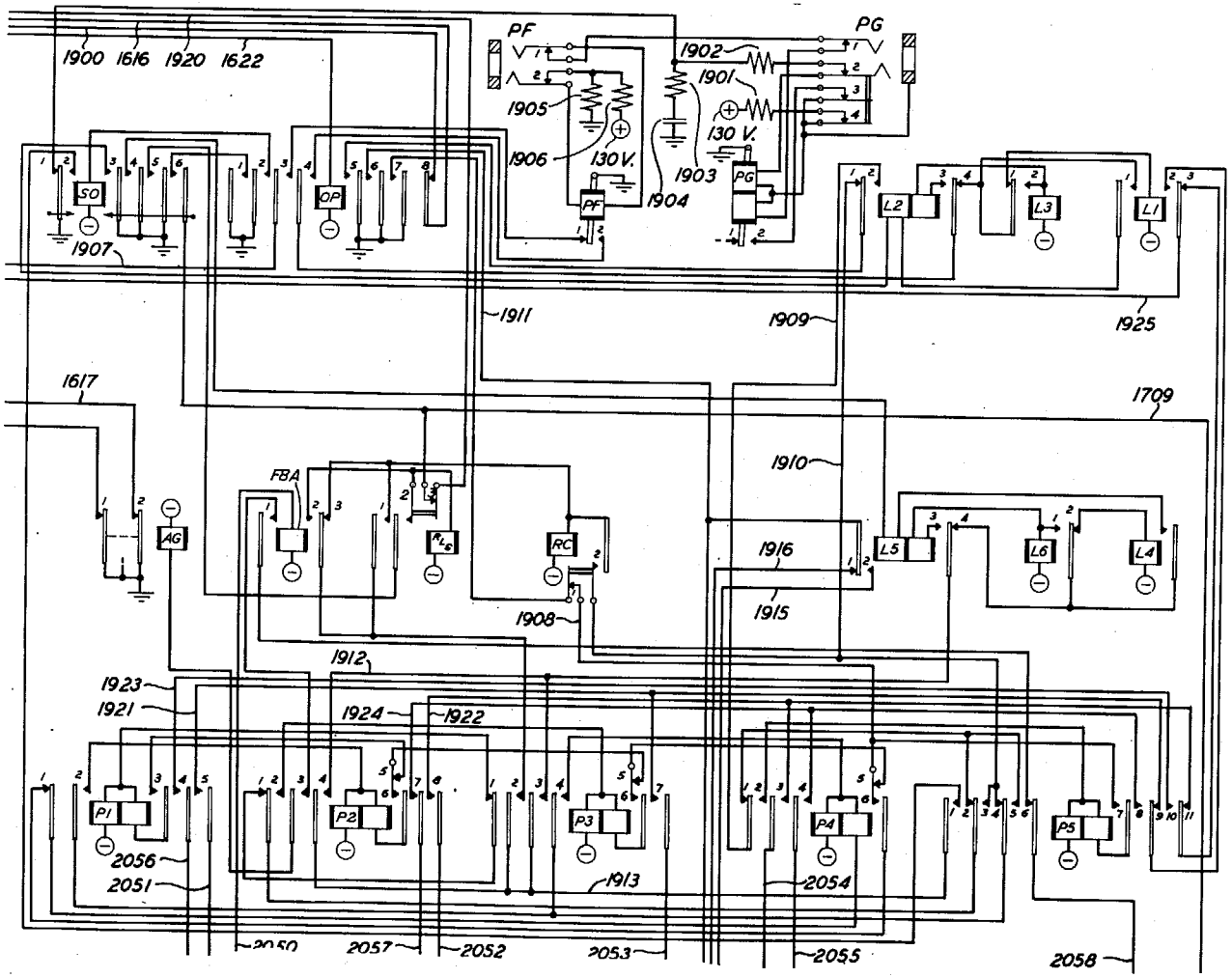
Figure 20:
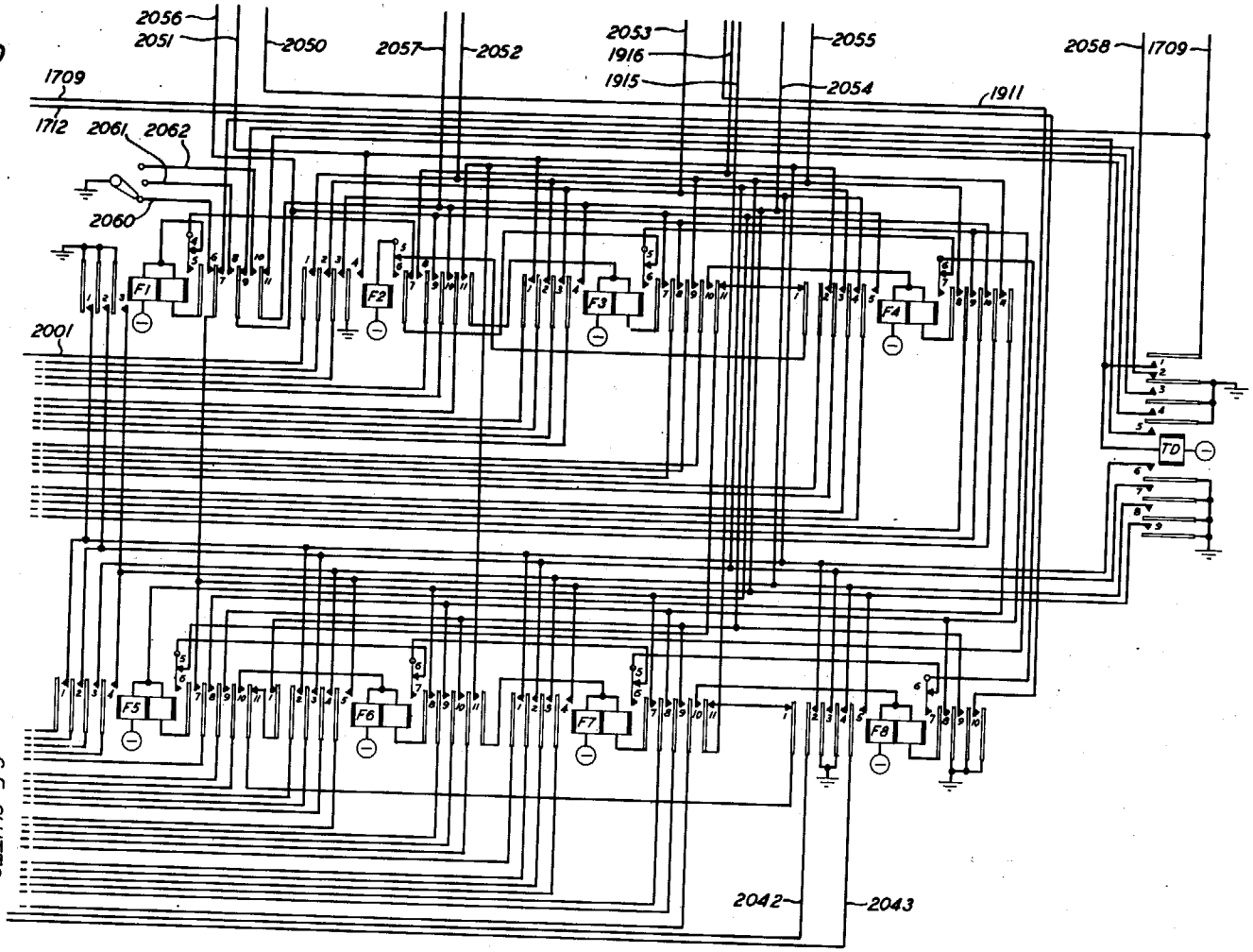

The operation of relay OP(19) as above described initiates the operation of the alarm scanning and indication sending circuit shown in Figs. 19 and 20. Briefly, the operation of relay OP(19) starts a condenser timed pulse generator including relays PG(19) and PF(19), which transmits pulses to the counting relay chains P1(19) to P5(19) and F1(20) to F8(20) and at the same time transmits a series of pulses of 900-cycle current to the attended station to operate the indication receiving distributor or scanner there. The counting relays of Figs. 19 and 20 scan the alarm registration and indication leads and when a lead, grounded by the associated alarm register relay or by the associated condition indicating device, is scanned a pulse of 700-cycle current is sent out.

The upper winding of the pulse generating relay PG(19) is normally energized by a circuit extending from +130-volt battery, resistance 1901, contact 4 of jack PG(19), upper winding of relay PG(19), contact 2 of jack PG(19), resistance 1902, to ground at contact 1 of relay SO(19). This circuit also extends from resistance 1902 to ground through resistance 1903 and condenser 1904, but condenser 1904 is held discharged by the ground supplied by relay SO(19). The circuit for the lower winding of relay PG(19) may be traced from battery through resistance 1901 and over contact 4 of jack PG(19), through the lower winding of relay PG(19), contact 1 of jack PG(19), contact 1 of jack PF(19), winding of relay PF(19), contact 2 of jack PF(19), to a low battery potential supplied by the voltage divider comprising resistances 1905 and 1906 connected between +130-volt battery and ground. Relays PG(19) and PF(19) are energized in the above-traced circuits in a direction to close their left contacts or contacts 1.

As soon as relay OP(19) operates, a circuit is closed from ground over contact 1 of relay PF(19), contact 3 of relay OP(19), conductor 1907 to battery through the winding of relay P2(16), causing the latter relay to operate and permit 900-cycle current to flow over the two-wire alarm channel. The effect of this current at the attended station will be described hereinafter.

As previously mentioned, relay OP(19) closes an obvious circuit for relay SO(19) but the latter relay is slow to operate so that the first pulse of 900-cycle current is prolonged to permit the attended station to prepare to receive the subsequent pulses. When relay SO(19) opens its contact 1, condenser 1904 starts to charge through the upper winding of relay PG(19), prolonging the previous energization of that winding to hold contact 1 closed. When the condenser is charged, the current flow in the upper winding ceases and the energization of the lower winding becomes effective to close contact 2.

When relay PG(19) closes its contact 2, it connects ground over contacts 3 and 4 of jack PG(19) in shunt with battery through resistance 1901. Current now flows from low poential battery through the winding of relay PF(19) and the lower winding of relay PG(19) to ground, thereby energizing these windings in the reverse direction and causing relay PF(19) to close its contact 2. The effect of the reversal in the lower winding of relay PG(19) is delayed by the discharge of condenser 1904 through the upper winding of relay PG(19) which holds contact 2 of that relay closed for a measured interval.

When condenser 1904 has discharged, contact 2 of relay PG(19) opens and the original energizing circuit for relay PF(19) and the lower winding of relay PG(19) and charging circuit for condenser 1904 is again effective. Relay PF(19) immediately recloses its contact 1.

Relay PG(19) continues to close and open its contact 2 at intervals determined by the resistance and capacity in its circuits and relay PF(19) alternately closes its contacts 2 and 1 until the indication sending operation is completed as will be described hereinafter. Each time that relay PF(19) closes its contact 1, a pulse of 900-cycle current is transmitted to the attended station.

When relay PF(19) first closes its contact 2, it completes a circuit over contact 4 of relay OP(19), contact 4 of relay L2(19), contact 1 of relay L3(19) to battery through the winding of relay L1(19). Relay L1(19) operates in this circuit and closes a locking circuit for itself from battery through its winding, contact 1 of relay L3(19), contact 1 of relay L1(19), left winding of relay L2(19) to ground at contact 3 of relay SO(19). Relay L2(19) cannot operate at this time, being shunted by the operating circuit of relay L1(19). When relay PF(19) opens its contact 2, relay L2(19) operates.

At the second closure of the contact 2 of relay PF(19) a circuit is closed from ground over contact 2 of relay PF(19), contact 4 of relay OP(19), contact 3 and the right winding of relay L2(19) to battery through the winding of relay L3(19). Relay L2(19) is held operated and relay L3(19) is operated in this circuit. Relay L3(19) opens the operating and locking circuits of relay L1(19) and closes a locking circuit for itself over its contact 2 and contact 1 of relay L1(19) through the left winding of relay L2(19) to ground at contact 3 of relay SO(19) to insure that relay L1(19) will be released before relay L3(19) can release to reclose the operating circuit for relay L1(19). When relay PF(19) again opens its contact 2, relays L2(19) and L3(19) release and the pulse dividing relays L1(19), L2(19) and L3(19) are ready to recycle in response to the subsequent closures of contact 2 of relay PF(19).

It will therefore be apparent that when relay PF(19) opens its contact 2 and closes its contact 1 to send out a pulse of 900-cycle current after the first and subsequent odd-numbered closures of that contact, relay L2(19) is operated, relay L1(19) remaining operated and when that contact opens, following the second and subsequent even-numbered closures of that contact, relay L2(19) is released.

The left armature of relay L2(19) is grounded over contact 5 of relay OP(19). Therefore, with relay L2(19) operated after odd-numbered pulses, ground is connected over contact 2 of relay L2(19) to conductor 1909, and with relay L2(19) released after even-numbered pulses, ground is connected over contact 1 of relay L2(19) to conductor 1910.

The first connection of ground to conductor 1909 in response to the first pulse completes a circuit over contact 1 of relay P4(19), contact 2 of relay P5(19), contact 1 of relay P2(19), contact 1 of relay P3(19) to battery through the left winding of relay P1(19). Relay P1(19) operates and locks in a circuit from battery through its two windings, contact 3 of relay P1(19), contact 5 of relay P2(19), contact 5 of relay P3(19), contact 5 of relay P4(19), conductor 1908, contact 1 of relay RC(19) to ground at contact 7 of relay OP(19).

When conductor 1910 is now grounded in response to the second pulse, a circuit is closed from ground on that conductor over contact 4 of relay P5(19), contact 2 of relay P1(19) to battery through the left winding of relay P2(19). Relay P2(19) operates and locks through its two windings and over its contact 6, contact 5 of relay P3(19), contact 5 of relay P4(19) to ground over conductor 1908 as above traced. At its contact 5, relay P2(19) opens the locking circuit of relay P1(19) and the latter relay releases.

With relay P2(19) operated, the connection of ground to conductor 1909 in response to the third pulse completes a circuit over contact 1 of relay P4(19), contact 2 of relay P5(19), contact 2 of relay P2(19) to battery through the left winding of relay P3(19). Relay P3(19) operates and locks through its two windings and over its contact 6, contact 5 of relay P4(19) to ground over conductor 1908. At its contact 5, relay P3(19) opens the locking circuit of relay P2(19) and that relay releases.

Ground connected to conductor 1910 in response to the fourth pulse completes a circuit over contact 4 of relay P5(19), contact 4 of relay P3(19) to battery through the left winding of relay P4(19). Relay P4(19) operates and locks in a circuit from battery through its two windings, contact 1 of relay P1(19), contact 6 of relay P4(19) to ground over conductor 1908. Relay P4(19), at its contact 5 opens the locking circuit of relay P3(19) which releases.

Ground connected to conductor 1909 in response to the fifth pulse completes a circuit over contact 2 of relay P4(19) to battery through the left winding of relay P5(19). Relay P5(19) operates and locks through its two windings and over its contact 7 directly to ground on conductor 1908, thereby remaining operated over a plurality of additional pulses. Relay P4(19) is not released at this time.

Ground connected to conductor 1910 in response to the sixth pulse completes a circuit over contact 3 of relay P5(19), contact 1 of relay P2(19), contact 1 of relay P3(19) to battery through the left winding of relay P1(19). Relay P1(19) operates, opening at its contact 1 the locking circuit of relay P4(19) which releases, permitting relay P1(19) to lock over the circuit previously traced.

When conductor 1909 is grounded in response to the seventh pulse, a circuit is completed over contact 1 of relay P4(19), contact 5 of relay P5(19) and contact 2 of relay P1(19) to battery through the left winding of relay P2(19). Relay P2(19) operates, locks in the circuit previously traced and releases relay P1(19). It also closes a circuit to control the counting relay chain of Fig. 20, which will be described hereinafter.

In response to the eighth pulse, ground is connected to conductor 1910, completing a circuit over contact 3 of relay P5(19), contact 2 of relay P2(19), to battery through the left winding of relay P3(19). Relay P3(19) operates, locks in the circuit above traced and releases relay P2(19).

With relay P3(19) operated, a circuit is closed from ground at contact 2 of relay SO(19), contact 1 of relay P5(19), contact 2 of relay P3(19), contact 3 of relay F8A(19) to battery through the winding of recycle relay RC(19). Relay RC(19) operates and locks over its contact 2 to ground on conductor 1910. At its contact 1, relay RC(19) opens the locking circuit of relays P3(19) and P5(19) and these relays release, ready to count another series of pulses. When ground is removed from conductor 1910, relay RC(19) also releases to prepare the locking circuits for relays P1(19) to P5(19). These relays continue to count in cycles until the alarm scanning operation is completed.

When relay OP(19) operated to initiate the alarm scanning operation, a circuit was closed from ground at contact 6 of relay OP(19), conductor 1911, contact 6 of relay F8(20), contact 5 of relay F7(20), contact 6 of relay F6(20), contact 5 of relay F5(20), contact 6 of relay F4(20), contact 5 of relay F3(20), contact 7 of relay F2(20), contact 4 of reday F1(20) to battery through the left winding of relay F1(20). Relay F1(20) operates and locks in a circuit from battery through its windings and over its contact 5 to the operating circuit above traced. Relay F1(20) prepares the first seven signal sending and alarm scanning circuits as will be described.

When relay P2(19) operates in response to the seventh pulse of a series, a circuit is closed from battery through the winding of relay L4(19), contact 2 of relay L6(19), contact 4 of relay L5(19), conductor 1912, contact 4 of relay P2(19), conductor 1913, contact 1 of relay P5(19) to ground at contact 2 of relay SO(19). When relay P3(19) operates in response to the eighth pulse of a cycle, it closes a substitute connection between conductors 1912 and 1913 at its contact 3, so that the circuit of relay L4(19) remains closed through two pulses.

Relays L4(19), L5(19) and L6(19) function in the same manner as relays L1(19), L2(19) and L3(19), relay L4(19) locking through the winding of relay L5(19) and the latter relay operating when relay P3(19) is released at the end of the cycle. Therefore, relays L4(19) and L5(19) are operated after the first and subsequent odd-numbered cycles of relays P1(19) to P5(19) and are released after the second and subsequent even-numbered cycles.

The left armature of relay L5(19) is grounded over conductor 1911, connecting ground over its contact 2 to conductor 1915 when operated at the end of odd cycles and over its contact 1 to conductor 1916 at the end of even cycles.

Ground connected to conductor 1915 by the operation of relay L5(19) at the end of the first cycle completes a circuit over contact 11 of relay F7(20), contact 1 of relay F8(20), contact 11 of relay F5(20), contact 1 of relay F6(20), contact 11 of relay F3(20), contact 1 of relay F4(20), contact 5 and winding of relay F2(20) to battery. Relay F2(20) operates and locks over its contact 6, contact 5 of relay F3(20) and thence as traced for relay F1(20) to ground on conductor 1911. At its contact 7, relay F2(20) opens the locking circuit at relay F1(20), which thereupon releases.

At the end of the second cycle of pulses, relay L5(19) is released and conductor 1916 grounded, thereby completing a circuit over contact 11 of relay F2(20) to battery through the left winding of relay F3(20). Relay F3(20) locks over its contact 6 to the previously traced locking circuit, at the same time opening its contact 5 to release relay F2(20). In a similar manner relays F4(20) to F8(20) are operated and relays F3(20) to F7(20) are released in turn.

As soon as relay F8(20) operates, a circuit is closed from ground at contact 10 of relay F8(20), conductor 2050 to battery through the winding of relay F8A(19) operating the latter relay. With relay F8A(19) operated, when relay P2(19) operates in response to the second pulse of the cycle, a circuit is closed from ground at contact 2 of relay TD(20), conductor 2058, contact 6 of relay P5(19), contact 1 of relay F8A(19), contact 3 of relay P2(19) to battery through the winding of relay AG(19). Relay AG(19) operates in this circuit to open the locking grounds for the alarm register relays A1(16) to AN(16) to release all such relays which are not held by the alarm circuits themselves. Relay F8A(19) at its contact 3 opens the circuit of recycle relay RC(19) and at its contact 2 prepares a circuit for release relay RLS(19). Therefore, when relay P3(19) operates in response to the eighth pulse of this cycle, a circuit is closed from ground at contact 2 of relay SO(19), over contact 1 of relay P5(19), conductor 1913, contact 2 of relay P3(19), contact 2 of relay F8A(19) to battery through release relay RLS(19). Relay RLS(19) operates in this circuit and locks over its contact 2 to ground at contact 5 of relay SO(19). At its contact 1, relay RLS(19) closes a substitute circuit for relay RC(19) which operates to release relays P1(19) to P5(19).

At its contact 3, relay RLS(19) opens the locking circuit of relay OP(19) which releases, in turn releasing relay SO(19). Relay SO(19) opens the locking circuit of relay RLS(19) and releases relay F8(20), which in turn releases relay F8A(19) and relay RLS(19). The release of relay SO(19) again connects ground in shunt with condenser 1904 to stop the operation of the pulse generating relay PG(19). The alarm scanning and indication sending circuit has now been restored to normal.

The operation of the five counting relays P1(19) to P5(19), as described, to count eight pulses in combination with the operation of the eight counting relays F1(20) to F8(20) to count eight pulse cycles defines sixty-four pulse periods. In each of these periods a circuit is prepared for relay P1(16) by which a pulse of 700-cycle current may be sent over the two-wire alarm channel to the attended office.

In periods 1 to 4 a pattern of synchronizing pulses is sent, while in periods 5 to 7 one to three station identifying pulses are sent under the control of relay F1(20). The eighth period of each cycle is used for restoring the counting relays of Fig. 19 and operating the next relay of the chain of Fig. 20 as above described. With relay F2(20) operated, a fifth synchronizing lead and six alarm registration leads are connected through to contacts of the counting relays of Fig. 19, which extend them one at a time to the winding of relay P1(16) which operates when connected to a lead which has been grounded by the registration of the corresponding alarm condition. Similarly relays F3(20) to F7(20) each connect through seven alarm registration leads so that forty-one alarm registration leads are scanned in this manner. Relay F8(20) connects through the forty-second alarm lead, a special no alarm lead and five synchronizing leads to the relays of Fig. 19.

To illustrate the foregoing statements, a few of the circuits for relay P1(16) will be traced in detail. During the first period, at which time relays F1(20) and L1(19) are operated, as soon as relay P1(19) operates, a circuit is closed from ground over contact 1 of relay F1(20), conductor 2051, contact 5 of relay P1(19), conductor 1921, contact 9 of relay P5(19), contact 2 of relay L1, conductor 1925, to battery through the winding of relay P1(16). Relay P1(16) operates, removing the short circuit from the shunt arm of pad 1612 and permitting a pulse of 700-cycle current to be fed to the two-wire channel. In the second period, relay F1(20) is still operated and relay L1(19) is released. As soon as relay P2(19) operates a circuit is closed from ground over contact 2 of relay F1(20), conductor 2052, contact 8 of relay P2(19), conductor 1922, contact 11 of relay P5(19), contact 3 of relay L1(19), conductor 1925 to battery through the winding of relay P1(16), operating relay P1(16) to transmit a second pulse.

In the third period, the circuit of relay P1(16) is extended over contact 2 of relay L1(19), contact 9 of relay P5(19), conductor 1921 and contact 7 of relay P3(19) to conductor 2053, but no circuit is completed to this conductor by relay F1(20). Therefore, no pulse is sent in the third period.

In period 4 with relays F1(20) and P4(19) operated and relay L1(19) released the circuit of relay P1(16) extends from conductor 1925 over contact 3 of relay L1(19), contact 11 of relay P5(19), conductor 1922, contact 3 of relay P4(19), conductor 2054, contact 3 of relay F1(20) to ground, causing another synchronizing pulse to be transmitted.

In the fifth, sixth and seventh pulse periods, with relay P5(19) operated in combination with relays P4(19), P1(19) and P2(19) the circuit of relay P1(16) is extended to conductors 2055, 2056 and 2057 which are connected by relay F1(20) to terminals 2060, 2061 and 2062. These terminals are cross-connected to ground according to the following code as a means for identifying the office which is sending the alarm indications.

| Station | Terminals Grounded |
|---|---|
| 1 | 2060 |
| 2 | 2061 |
| 3 | 2060 and 2061 |
| 4 | 2060 and 2062 |
| 5 | 2061 and 2062 |
| 6 | 2060, 2061 and 2062 |

The station shown having been assumed to be station 1, only terminal 2060 is grounded and a pulse is sent only in period 5.

As previously mentioned, pulse period 8 is used for operating relay F2(20), releasing relay F1(20) and releasing relays P1(19) to P5(19). In pulse period 9, with relays F2(20), P1(19) and L1(19) operated the circuit of relay P1(16) extends over contact 2 of relay L1(19), contact 9 of relay P5(19), conductor 1921, contact 5 of relay P1(19), conductor 2051, contact 4 of relay F2(20) to ground to send the last of the synchronizing pulses.

In the next or tenth pulse period, relay L1(19) is released and relay P2(19) is operated and the circuit of relay P1(16) extends over contact 3 of relay L1(19), contact 11 of relay P5(19), conductor 1922, contact 8 of relay P2(19), conductor 2052, contact 1 of relay F2(20), conductor 2001 to ground at contact 6 of alarm register relay A1(16), the operation of which was previously described.

In the next forty effective pulse periods, relay P1(16) is connected successively to forty conductors leading to other alarm register relays (not shown) similar to relay A1(16). If any of these alarm register relays are operated, relay P1(16) is operated and a 700-cycle pulse sent out in the corresponding pulse period.

In pulse period 57, at which time relay F8(20) is operated, together with relay P1(19) and relay L1(19), the circuit of relay P1(16) is extended as previously traced to conductor 2051 and thence over contact 2 of relay F8(20) to conductor 2042 which leads to contact 6 of relay AN(16). Since relay AN(16) is not operated relay P1(16) does not operate and no pulse is sent out.

In the next two periods relay P1(16) is connected to conductors 2052 and 2053, which are grounded over contacts 3 and 4 of relay F8(20) and two synchronizing pulses are sent. In period sixty, relay P1(16) is connected to conductor 2054 which is extended over contact 5 of relay F8(20), conductor 2043 to the back contact of relay NA(16).

If only temporary alarm conditions had been registered, all of the alarm register relays will have been released by the operation of relay AG(19). Relay NA(16) will be released at this time and a pulse will be sent out. If, as assumed, a more permanent alarm condition exists such as a blown fuse, the associated alarm register relay, such as relay A1(16) will remain operated, holding relay NA(16) operated and no pulse will be sent.

In period sixty-one, relay P1(16) is connected to conductor 2055 but no circuit is completed over this conductor by relay F8(20) and no pulse is sent. In periods sixty-two and sixty-three relay P1(16) is connected to conductors 2056 and 2057 which are grounded over contacts 8 and 9 of relay F8(20) causing the transmission of a final pair of synchronizing pulses. In period sixty-four the alarm indication sending circuit is released as described above.

It may be noted that the circuit of relay P1(16) takes two paths through the contacts of relays P1 to P5 which are closed alternately by the operation and release of relay L1(19), one path extending over the odd-numbered relays and the other over the even-numbered relays so that relay P1(16) may not be falsely operated during the short interval when two successive relays are operated.

Alarm indication receiving

At the attended station the pulses of 900-cycle current are received by the 900-cycle filter 1201 and amplified and detected by the amplifier-detector 1203. The full wave rectifier 1204 is connected to the output of the detector tube 1205 and the upper winding of relay P13(12) is connected across the rectifier, so that relay P13(12) operates to open its contact 2 and close its contact 1 in response to each pulse of 900-cycle current. With contact 2 closed, ground is connected over conductor 1206, contact 5 of relay T(8), conductor 811, contact 9 of relay SR1(9), conductor 902, contact 1 of relay T(8) through resistance 812 to condenser 813 to hold the condenser discharged for a purpose to be described later.

At the beginning of the first pulse relay P13(12) disconnects ground from conductor 1206 and connects ground to conductor 1207. Ground on conductor 1207 completes a circuit over contact 8 of relay T(8), conductor 814, to battery through the winding of relay SR(9). It will be remembered that the first pulse sent out was of extra length which gives time for relay SR(9) to operate and to perform the necessary functions to prepare the indication scanner for operation. With relay SR(9) operated, an obvious circuit is closed for relay SR1(9). Relay SR(9) is slow to release so that it will remain operated and hold relay SR1(9) operated throughout the indication receiving operation. At its contact 1, relay SR(9) opens the previously traced circuit over conductor 208 for sending the alarm sending order and also removes ground from conductor 903 which is used for sending other orders so that no order can be sent until the alarm indication receiving operation is finished. At its contact 3, relay SR(9) extends conductor 811 to conductor 904 and the left armature of relay L2(6).

Relay SR1(9) supplies operating and locking ground to the indication scanner and closes a circuit from ground over its contact 6 and contact 2 of key 900 to battery through the winding of relay W(9). In addition, it connects conductor 902 over its contact 8 to conductor 905. Relay SR1(9) also closes a circuit from ground over its contact 4, conductor 907, contact 6 of relay F8(10), contact 7 of relay F7(10), contact 6 of relay F6(10), contact 7 of relay F5(10), conductor 1000, contact 6 of relay F4(7), contact 5 of relay F3(7), contact 7 of relay F2(7), contact 4 and right winding of relay F1(7) to battery. Relay F1(7) operates and locks in a circuit from battery through its windings and over its contact 5 and thence over its operating circuit as above traced to ground at contact 4 of relay SR1(9).

At the end of the preliminary pulse, ground is removed from conductor 1207 and reconnected to conductor 1206. Ground on conductor 1206 is extended as above traced to the left armature of relay L2(6), and a circuit is completed over contact 1 of relay L2(6), contact 1 of relay L3(6) to battery through the winding of relay L1(6). Relay L1(6) operates, closing a locking circuit for itself from battery through its winding, contact 1 of relay L3(6), contact 3 of relay L1(6), right winding of relay L2(6), conductor 600 to ground at contact 3 of relay SR1(9), but relay L2(6) does not operate, being shunted by the operating circuit of relay L1(6).

The next pulse of 900-cycle current causes relay P13(12) to remove ground from conductor 1206 and connect it to conductor 1207, thereby reclosing the circuit of relay SR(9) to insure that it remains operated, and opening the operating circuit for relay L1(6), permitting relay L2(6) to operate.

With relay L2(6) operated a circuit is closed from ground at contact 1 of relay SR1(9), conductor 906, contact 3 of relay L2(6), conductor 601, contact 1 of relay P4(7), contact 1 of relay P5(7), contact 1 of relay P2(7), contact 1 of relay P3(7) to battery through the left winding of relay P1(7). Relay P1(7) operates and locks in a circuit through its windings and over its contact 5, contact 6 of relay P2(7), contact 5 of relay P3(7), contact 6 of relay P4(7), conductor 700, contact 2 of relay RC(6) to ground over conductor 906.

It will be remembered that overlapping the first short 900-cycle pulse, a synchronizing pulse of 700-cycle current was sent out by the unattended station. This pulse is received by filter 1202 which is normally connected with the two-wire channel 1402 over back contacts of transfer relay T(12). The 700-cycle pulse is amplified and detected by amplifier-detector 1208 which is similar to amplifier-detector 1203 and causes relay P14(12) to close its contact.

The operation of relay P14(12) closes a circuit from ground over its contact, conductor 1209, contact 2 of relay L1(6), conductor 602, contact 10 of relay P5(7), contact 4 of relay P1(7), contact 6 of relay F1(7), conductor 705 to battery through the winding of relay D1(7). Relay D1(7) operates and locks over its contact 1 and conductor 701 to ground at contact 1 of relay RLS(6).

Relays L1(6), L2(6) and L3(6) are operated and released under the control of relay P13(12) in the same manner as described for relays L1(19), L2(19) and L3(19) at the unattended station. Relays P1(7) to P5(7) are operated and relays P1(7) to P3(7) reoperated under the control of relay L2(6) in the manner described for relays P1(19) to P5(19) to count the pulses in each cycle.

When relay P2(7) operates, following the operation of relay P5(7), it closes a circuit from ground at contact 5 of relay SR1(9), conductor 908, contact 5 of relay P5(7), contact 9 of relay P2(7), conductor 702, contact 1 of relay L5(6), contact 1 of relay L6(6), to battery through the winding of relay L4(6). Relay L4(6) operates and locks in a circuit from battery through its winding, contact 1 of relay L6(6), contact of relay L4(6), right winding of relay L5(6), conductor 603 to ground at contact 2 of relay SR1(9). When relay P3(7) operates it closes at its contact 8 a link in this circuit in parallel with contact 9 of relay P2(7) to maintain this circuit closed. Relay P3(7) also closes a circuit from ground on conductor 908, contact 5 of relay P5(7), contact 7 of relay P3(7), conductor 703, to battery through the winding of relay RC(6). Relay RC(6) is effective to release relays P3(7) and P5(7) to recycle the counting relays in the manner described for relay RC(19). At its first operation, relay RC(6) closes a circuit from ground over its contact 3, conductor 606, contact 3 of key 900 to battery through the winding of relay DW(9). Relay DW(9) operates and locks over its contact 1 and conductor 910 to ground at contact 6 of relay RLS(6). At its contact 2 it closes a circuit for lamp 911 which indicates that the transmitting station is located on the West line.

The release of relay P3(7) permits relay L5(6) to operate and close a circuit from ground on conductor 907, contact 3 of relay L5(6), conductor 604, contact 1 of relay F7(10), contact 1 of relay F8(10), contact 1 of relay F5(10), contact 1 of relay F6(10), conductor 1001, contact 11 of relay F3(7), contact 1 of relay F4(7), contact 5 and winding of relay F2(7) to battery. Relay F2(7) operates, locks over its contact 6 and the chain circuit previously traced, and opens the locking circuit of relay F1(7).

Relays F1(7) to F8(10) are further operated in a manner similar to relays F1(29) to F8(20) of the unattended station to count the pulse cycles.

It will be remembered that synchronizing pulses of 700 cycles were transmitted during the first, second and fourth pulse periods, a station identifying pulse was transmitted in period 5 and an additional synchronizing pulse in period 9, followed by an alarm indicating pulse in period 10. The circuit for lighting lamp 741 in response to the synchronizing pulse in period 1 has been traced.

When relay P13(12) recloses its contact 2 following the first short pulse of 900-cycle current, relay L2(6) is held operated, relay L3(6) operated and relay L1(6) released. Relay L3(6) connects ground to conductor 905 to discharge condenser 813 which has partially charged during the 900-cycle pulse.

When the second short pulse is received, relays L2(6) and L3(6) release closing a circuit for operating relay P2(7), which releases relay P1(7). The second synchronizing pulse of 700-cycle current operates relay P14(12) and a circuit is closed from ground over the contact of relay P14(12), conductor 1209, contact 1 of relay L1(6), conductor 605, contact 8 of relay P5(7), contact 3 of relay P2(7), contact 7 of relay F1(7) to conductor 706 which is connected to a relay similar to relay D1(7) which locks. In pulse period 3 no pulse is received and no lamp relay is operated, but the synchronizing pulse received in period 4 operates the lamp relay associated with conductor 708. In pulse period 5, the operation of relay P14(12) in response to the station identifying pulse, closes a circuit from ground over the contact of relay P14(12), conductor 1209, contact 2 of relay L1(6), conductor 602, contact 9 of relay P5(7), contact 3 of relay P4(7), contact 1 of relay F1(7), conductor 709, to battery through the winding of relay S1(6). Relay S1(6) operates and locks over its contact 9 to ground at contact 8 of relay RLS(6). No station identifying pulses are received during periods 6 or 7 so that relays S2(6) and S3(6) are not operated.

When the synchronizing pulse is received in period 9, which is the first period of the second cycle, a circuit is closed from ground over the contact of relay P14(12), conductor 1209, contact 2 of relay L1(6), conductor 602, contact 10 of relay P5(7), contact 6 of relay P1(7), contact 1 of relay F2(7), conductor 712 to battery through the winding of relay D5(7). Relay D5(7) also locks to ground on conductor 701 and closes a circuit for lighting lamp 745. In addition it connects battery over conductor 704 to the station identifying lamps 611 to 616, to the synchronism checking lamps, including lamp 741 and to the direction lamps 911 and 912. With relay S1(6) operated and battery connected to conductor 704 a circuit is closed from ground over contact 3 of relay S1(6), contact 2 of relay S2(6), contact 3 of relay S3(6) through lamp 611 to battery on conductor 704 to light lamp 611 indicating that the indication is being sent by station 1.

The alarm indication pulse transmitted in period 10 causes the grounding of conductor 713 and the lighting of the corresponding lamp. Similarly, if any other alarm or condition indicating pulses are transmitted the corresponding lamp will be lighted, and the final synchronizing pulses will light the synchronizing lamps including lamp 1092.

If a pulse is received during the sixtieth pulse period, indicating that the alarm condition has disappeared, the operation of relay P14(12) closes a circuit from ground over its contact, conductor 1209, contact 1 of relay L1(6), conductor 605, contact 8 of relay P5(7), contact 4 of relay P4(7), conductor 739, contact 5 of relay F8(10), conductor 1002, contact 5 of order key ORD1(2), conductor 209, to battery through the winding of relay NAA(9). Relay NAA(9) operates and locks over its contact 1 to ground at contact 6 of relay SR1(9), and extends its locking ground over its contact 2 to battery through the winding of relay NA(9). With relays W(9) and S1(6) operated as previously described, the operation of relay NA(9) opens the locking circuit of relay ST1(8) to restore the station alarm circuit and prepare for receiving subsequent alarms from that station. It may be noted that relays S1(6), S2(6) and S3(6) when operated to identify a particular station, furnish supplementary locking grounds for the relays like relays ST1(8) and ST12(8) for all other stations on the alarm line in use, while relay W(9) or E(9) locks the alarm signal of stations on the alarm line not being used.

After the sixty-fourth pulse period no further pulses of 900-cycle current are received and relay P13(12) holds its contact 2 closed and its contact 1 open so that slow relay SR(9) now releases, in turn releasing relay SR1(9) which opens the locking circuits for relays P3(7), P5(7) and F8(10) and restores the connection between contact 2 of relay P13(12) and condenser 813. The lamp controlling relays are locked under the control of relay RLS(6) and therefore remain operated.

The indicating lamps are arranged in a pattern under a glass shelf on which a transparent record sheet may be placed and the positions of the lighted lamps checked to record the trouble indicated. Release key 607 may then be operated to operate relay RLS(6), restore the indicating relays and extinguish all lamps.

It will be remembered that synchronizing pulses are sent during the first, second, fourth and fifth pulse periods with no pulse sent in period 3 and again in periods 58, 59, 62 and 63 with no pulse sent in periods 61 and a possible non-indicating pulse in position 60. The purpose of these groups of pulses is to enable the attendant to check that noise or faulty operation of the equipment has not thrown the two scanners out of synchronism. If the synchronizing lamps are not operated in the correct pattern the whole indication is disregarded and a new indication order sent.

Test order

In order to determine whether the alarm scanning and indication scanning circuits are functioning properly, order 6 is used. The desired station key, for example key STA1(2) and order key ORD6(2) are operated, as well as key 900, assuming that station 1 on the west alarm line is to be tested, followed by the start key 300.

The operation of the order sending circuit is the same as previously described, except that, with order key ORD6(2) operated, relays F3(1) and F5(1) are operated to send out successive pulses of frequency 3 and frequency 5. In addition, ground is connected over contact 6 of key OD6(2), conductor 210, contact 1 of relay B(3), conductor 305 to battery through the winding of relay RLS(6) to insure that all previous indications are released. When relay B(6) operates this circuit is opened and relay RLS(6) releases to be ready to lock in the indications sent in response to the test order.

At station 1, these currents cause the operation of relay B(17), followed by relay D(17), in the manner described. Relay F(17) is operated, but relay G(17) is not operated. With relays B(17) and D(17) operated a circuit is closed from ground over contact 3 of relay B(17), contact 5 of relay D(17), contact 5 of relay G(17), conductor 1712 to battery through the winding of relay TD(20).

Relay TD(20) extends its operating ground to conductor 1709 to operate relay OP(19) which initiates the operation of the scanning circuit as previously described. Relay TD(20) is held operated over the locking circuit of relay OP(19). Relay TD(20) connects ground over its contacts 6, 7, 8 and 9 directly to conductors 2051, 2052, 2053 and 2054. With relay F1(20) operated conductors 2055, 2056 and 2057 are extended over contacts 6, 8 and 10 of that relay, to terminals 2060, 2061 and 2062 to permit the station to identify itself. As soon as relay F1(20) is released, these three conductors are extended to ground over contacts 7, 9 and 11 of relay F1(20) and contacts 3, 4, and 5 of relay TD(20). Therefore, a pulse of 700-cycle current is sent out in each pulse period under the control of relay TD(20) except in the periods 5, 6 and 7 which are used for station identification.

At the attended station the indication scanner functions as previously described, the relays connected to all of the synchronizing and indicating conductors being operated and all of the lamps being lighted except for the code identification of the sending station, to provide a complete test of the indication relays and lamps.

Talking arrangements

If a maintenance man while working at an unattended station wishes to talk to the attended station, he will operate key 1414, holding it operated for at least five seconds. The operation of key 1414 connects ground to conductor 1907, operating relay P2(16) to cause 900-cycle current to be transmitted over the two-wire alarm channel.

At the attended office, relay P13(12) operates as previously described in turn operating relays SR(9) and SR1(9). With relays P13(12) and SR1(9) operated, ground is disconnected from resistance 812 and condenser 813 starts to charge from +130-volt battery, through resistance 815. Resistance 815 and condenser 813 are so chosen that condenser 813 will receive only a small charge during the pulses used in transmitting an alarm indication as above described. Condenser 813 is connected through resistance 816 to the control anode of tube 817. Ground through resistance 818 is connected to the cathode of tube 817, while +130-volt battery is connected through the winding of relay SV1(8) to the main anode of the tube. After a period of five seconds, condenser 813 receives a sufficient charge to cause tube 817 to break down, thereby operating relay SV1(8) which locks over its contact 4 through resistance 828 to ground at contact 2 of relay J1(8). At its contact 3 relay SV1(8) closes a circuit for lighting lamp 819 and at its contact 1 connects ground to conductor 820 to operate a calling-in signal. Relay SV1(8) at its contact 5 disconnects its own winding from tube 817 and at its contact 2, connects ground through resistance 821 to condenser 813, thereby discharging the condenser and quenching the tube.

At the unattended office the maintenance man, having released key 1404 lifts the handset 1405 from the rack closing an obvious circuit for relay T(15) which removes the terminating resistances 1406 and 1407 and connects the four-wire channel to the telephone circuit.

At the attended office the calling-in signal is answered by connecting handset 1505 with the telephone circuit jacks 1506 and connecting the telephone circuit with the four-wire channel by means of jacks 1507 and 1508 and patching cord 1509. Talking takes place over conductors 1511 and 1512, contacts 1 and 7 of relay A(3), conductors 303 and 304 and terminating circuit 1504. When cord 1509 is inserted in jack 1508 ground is connected to conductor 1510 to operate relay J1(8) and release relay SV1(8).

It will be understood that the telephone circuits shown are merely typical and that other telephone circuits may be used in place of or in addition to those shown.

If, while the maintenance man is at an unattended station, it is desired to communicate with him, order number 2 will be sent to that station. Assuming that station 1 is to be called, key STA1(2) is operated, as well as key ORD2(2). With key ORD2(2) operated, ground is connected to conductor 301 independent of the indication receiving circuit. With keys STA1(2) and ORD2(2) operated, the order sending circuit of Fig. 3 functions as previously described to send out a pulse of frequency 2, followed by pulse of frequency 4.

At station 1, these order currents cause the operation of relay A(17) and relay C(17). With relays A(17) and C(17) operated a circuit is closed from ground over contact 2 of relay A(17), contact 2 of relay C(17), contact 1 of relay F(17), conductor 1713 to battery through the winding of relay R(14). Relay R(14) operates and closes circuits for lighting lamp 1408 and sounding buzzer 1409. As previously mentioned, when the maintenance man is working at an unattended station he operates a key such as key 1812 to operate relay LA1(18) and render the local alarm effective. With relay LA1(18) operated, ground is connected to conductor 1814 so that relay R(14) locks up over the back contact of relay T(14). The operation of relay T(14) when the handset 1405 is lifted silences the buzzer. If the man has left the unattended station, restoring key 1812 before he leaves, relay R(14) is released following the release of the order receiving circuit. Talking takes place over the four-wire channel as previously described.

Operation with east alarm channel

The foregoing description has dealt with a subsidiary station connected to the west alarm channel. The stations connected with the east alarm channel 1515 are similarly equipped, each station having a generator for generating a characteristic alarm tone, the same tone being used as for the stations on the west channel. At the main station there are six alarm tone receiving filters 1300 to 1305 and their associated receiving circuits 1310 to 1315, individual to the stations on the east alarm channel, connected with that channel. Each of the alarm tone receiving circuits is connected to an alarm register, the one connected to receiving circuit 1315 being shown in the lower left part of Fig. 8. These alarm registers operate in the same manner as the alarm register connected to receiving circuit 1106 serving the west alarm channel, which is shown in the upper left part of Fig. 8 and which was described in detail.

There is a 900-cycle filter 1210 and receiving circuit 1211 connected with the east alarm channel which is normally connected over back contacts of relay T(8) to a calling-in signal circuit also shown in Fig. 8.

As previously stated, the 700-cycle filter 1202 is common to the two alarm channels and is normally connected with the west alarm channel over back contacts of relay T(12).

When an indication order is to be sent to a subsidiary station on the east alarm channel, key 901 is operated and a circuit is closed from ground over contact 4 of key 901, conductor 913 to battery through the winding of relay T(12). Relay T(12) operates and transfers the 700-cycle filter 1202 from the west alarm channel to the east alarm channel. Relay T(12) when operated closes a circuit from ground over its contact 5, conductor 1212 to battery through the winding of relay T(8). Relay T(8) operates, establishes substitute connections between the west channel 900-cycle receiving circuit 1203 and the west calling-in signal circuit, and connects conductors 1213 and 1214, controlled by the east 900-cycle receiving circuit 1211, to conductors 814 and 811 so that the indication scanner may be operated under the control of 900-cycle pulses transmitted over the east alarm channel.

What is claimed is:

1. In an alarm signaling system, a main station, a plurality of subsidiary stations, two signaling channels connecting said main station with all of said subsidiary stations in parallel, a plurality of alarm registering devices at each subsidiary station, a corresponding plurality of indicating devices at said main station, a pulse generating device at each subsidiary station, a scanning device at each subsidiary station for scanning said alarm registering devices, a scanning device at said main station for scanning said indicating devices, means responsive to the transmission of a code of alternating-current frequencies from said main station over one of said channels to initiate the operation of the pulse generating device at one of said subsidiary stations, means under the control of said pulse generating device to operate the scanning device at said one subsidiary station and to transmit a plurality of spaced pulses of alternating current of one frequency over said other channel to operate the scanning device at said main station, means under the control of operated ones of said alarm registering devices to transmit a pulse of alternating current of another frequency over said other channel and means under the control of the scanning device at said main station responsive to said pulse of another frequency to operate the corresponding indicating device.

2. In an alarm signaling system, a main station, a plurality of subsidiary stations, two signaling channels connecting said main station with all of said subsidiary stations in parallel, a plurality of alarm registering devices at each subsidiary station, a corresponding plurality of indicating devices at said main station, a pulse generating device at each subsidiary station, a scanning device at each subsidiary station for scanning said alarm registering devices, a scanning device at said main station for scanning said indicating devices, means responsive to the transmission of a code of alternating-current frequencies from said main station over one of said channels to initiate the operation of the pulse generating device at one of said subsidiary stations, means under the control of said pulse generating device to operate the scanning device at said one subsidiary station and to transmit a plurality of spaced pulses of alternating current of one frequency over said other channel to operate the scanning device at said main station, means under the control of operated ones of said alarm registering devices to transmit a pulse of alternating current of another frequency over said other channel, means under the control of the scanning device at said main station responsive to said pulse of another frequency to operate the corresponding indicating device, and means to transmit pulses of said other frequency concurrent with predetermined ones of said one frequency pulses to identify said subsidiary station.

3. In an alarm signaling system, a main station, a plurality of subsidiary stations, two signaling channels connecting said main station with all of said subsidiary stations in parallel, a plurality of alarm registering devices at each subsidiary station, a corresponding plurality of indicating devices at said main station, a pulse generating device at each subsidiary station, a scanning device at each subsidiary station for scanning said alarm registering devices, a scanning device at said main station for scanning said indicating devices, means responsive to the transmission of a code of alternating-current frequencies from said main station over one of said channels to initiate the operation of the pulse generating device at one of said subsidiary stations, means under the control of said pulse generating device to operate the scanning device at said one subsidiary station and to transmit a plurality of spaced pulses of alternating current of one frequency over said other channel to operate the scanning device at said main station, means under the control of an operated one of said alarm registering devices to transmit a pulse of alternating current of another frequency over said channel concurrent with one of said spaced pulses, and means under the control of the scanning device at said main station responsive to said pulse of another frequency to operate the corresponding indicating device.

4. In an alarm signaling system, a main station, a plurality of subsidiary stations, two signaling channels connecting said main station with all of said subsidiary stations in parallel, a plurality of alarm registering devices at each subsidiary station, a corresponding plurality of indicating devices at said main station, a pulse generating device at each subsidiary station, a scanning device at each subsidiary station for scanning said alarm registering devices, a scanning device at said main station for scanning said indicating devices, means responsive to the transmission of a code of alternating-current frequencies from said main station over one of said channels to initiate the operation of the pulse generating device at one of said subsidiary stations, means under the control of said pulse generating device to operate the scanning device at said one subsidiary station and to transmit a plurality of spaced pulses of alternating current of one frequency over said other channel to operate the scanning device at said main station, the operation of said scanning devices defining a plurality of pulse periods at each of said stations, means under the control of operated ones of said alarm registering devices to transmit a pulse of alternating current of another frequency over said other channel during predetermined corresponding ones of said pulse periods, and means under the control of the scanning device at said main station responsive to each said pulse of another frequency to operate the indicating device scanned during said predetermined pulse periods.

5. In an alarm signaling system, a main station, a plurality of subsidiary stations, two signaling channels connecting said main station with all of said subsidiary stations in parallel, a plurality of alarm registering devices at each subsidiary station, a corresponding plurality of indicating devices at said main station, a pulse generating device at each subsidiary station, a scanning device at each subsidiary station for scanning said alarm registering devices, a scanning device at said main station for scanning said indicating devices, means responsive to the transmission of a code of alternating-current frequencies from said main station over one of said channels to initiate the operation of the pulse generating device at one of said subsidiary stations, means under the control of said pulse generating device to operate the scanning device at said one subsidiary station and to transmit a plurality of spaced pulses of alternating current of one frequency over said other channel to operate the scanning device at said main station, the operation of said scanning devices defining a plurality of pulse periods at each of said stations, means under the control of operated ones of said alarm registering devices to transmit a pulse of alternating current of another frequency over said other channel, means to automatically transmit a plurality of pulses of said other frequency for synchronizing purposes during predetermined pulse periods, means effective during other predetermined pulse periods to transmit pulses of said other frequency in accordance with a code to identify said subsidiary station and means under the control of the scanning device at said main station to operate an individual indicating device in response to each pulse of said other frequency.

6. In an alarm signaling system, a main station, a plurality of subsidiary stations, two signaling channels connecting said main station with all of said subsidiary stations in parallel, a plurality of alarm registering devices at each subsidiary station, a corresponding plurality of indicating devices at said main station, a pulse generating device at each subsidiary station, a scanning device at each subsidiary station for scanning said alarm registering devices, a scanning device at said main station for scanning said indicating devices, means responsive to the transmission of a code of alternating-current frequencies from said main station over one of said channels to initiate the operation of the pulse generating device at one of said subsidiary stations, means under the control of said pulse generating device to operate the scanning device at said one subsidiary station and to transmit a plurality of spaced pulses of alternating current of one frequency over said other channel to operate the scanning device at said main station, the operation of said scanning devices defining a plurality of pulse periods at each of said stations, means under the control of operated ones of said alarm registering devices to transmit a pulse of alternating current of another frequency over said other channel during predetermined corresponding ones of said pulse periods, means under the control of the scanning device at said main station responsive to each said pulse of another frequency to operate the indicating device scanned during said predetermined pulse periods, and means responsive to the transmission of a different code of alternating-current frequencies over said one channel to cause the scanning device at one of said subsidiary stations to transmit pulses of said other frequency during each alarm pulse period, independent of said alarm registering devices.

7. In an alarm signaling system, a main station, a plurality of subsidiary stations, two signaling channels connecting said main station with all of said subsidiary stations in parallel, a plurality of alarm registering devices at each subsidiary station, a corresponding plurality of indicating devices at said main station, a pulse generating device at each subsidiary station, a scanning device at each subsidiary station for scanning said alarm registering devices, a scanning device at said main station for scanning said indicating devices, means responsive to the transmission of a code of alternating-current frequencies from said main station over one of said channels to initiate the operation of the pulse generating device at one of said subsidiary stations, means under the control of said pulse generating device to operate the scanning device at said one subsidiary station and to transmit a plurality of spaced pulses of alternating current of one frequency over said other channel to operate the scanning device at said main station, the operation of said scanning devices defining a plurality of pulse periods at each of said stations, means under the control of operated ones of said alarm registering devices to transmit a pulse of alternating current of another frequency over said other channel, means to automatically transmit a plurality of pulses of said other frequency for synchronizing purposes during predetermined pulse periods, means effective during other predetermined pulse periods to transmit pulses of said other frequency in accordance with a code to identify said subsidiary station, means under the control of the scanning device at said main station to operate an individual indicating device in response to each pulse of said other frequency, and means responsive to the transmission of a different code of alternating-current frequencies over said one channel to cause the scanning device at one of said subsidiary stations to transmit pulses of said other frequency during each pulse period except during said other predetermined pulse periods, during which said office identifying pulses are transmitted.

8. In an alarm signaling system, a main station, a plurality of subsidiary stations, one signaling channel connecting said main station with all of said subsidiary stations, a plurality of other signaling channels, each of said other signaling channels connecting said main station with a fraction of said subsidiary stations, a plurality of alarm registering devices at each subsidiary station, a corresponding plurality of indicating devices at said main station, a pulse generating device at each subsidiary station, a scanning device at each subsidiary station for scanning said alarm registering devices, a scanning device at said main station for scanning said indicating devices, means to connect the scanning device at said main station with one of said plurality of other signaling channels, means under the control of said pulse generating of a plurality of codes of alternating-current frequencies over said one signaling channel, means under the control of said connecting means to render said transmitting means effective, means at said subsidiary stations to receive alternating-current frequencies transmitted over said one signaling channel, the receiving means at each subsidiary station being tuned to respond only to predetermined ones of said frequencies, means responsive at one of said stations to the transmission of a particular one of said codes to initiate the operation of the pulse generating device at said one subsidiary station, means under the control of said pulse generating device to operate the scanning device at said one subsidiary station and to transmit a plurality of spaced pulses of alternating current of one frequency over said connected other channel to operate the scanning device at said main station, means under the control of an operated one of said alarm registering devices to transmit a pulse of alternating current of another frequency over said other channel, and means under the control of the scanning device at said main station responsive to said pulse of another frequency to operate the corresponding indicating device.

CHARLES E. CLUTTS.
GEORGE A. PULLIS.
ALFRED K. SCHENCK.
LAURANCE A. WEBER.

REFERENCES CITED

The following references are of record in the file of this patent or the original patent:

UNITED STATES PATENTS

| Number | Name | Date |
|---|---|---|
| 2,111,352 | Blake et al. | Mar. 14, 1938 |
| 2,117,580 | Snavely | May 17, 1938 |
| 2,444,078 | Weaver | June 29, 1948 |
| 2,456,533 | Preston et al. | Dec. 14, 1948 |